(12) United States Patent
Saito

(10) Patent No.: US 7,957,080 B2
(45) Date of Patent: Jun. 7, 2011

(54) IMAGING LENS

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 12/590,332

(22) Filed: Nov. 5, 2009

(65) Prior Publication Data

US 2010/0110566 A1    May 6, 2010

(30) Foreign Application Priority Data

Nov. 6, 2008    (JP) .................................. 2008-285271

(51) Int. Cl.
   *G02B 9/04*    (2006.01)
(52) U.S. Cl. ........................................ 359/795; 359/793
(58) Field of Classification Search .......... 359/793–795, 359/784, 785, 689–692
   See application file for complete search history.

(56) References Cited

U.S. PATENT DOCUMENTS

| 6,441,971 B2 * | 8/2002 | Ning | 359/739 |
| 6,968,128 B2 * | 11/2005 | Itoh | 396/79 |

FOREIGN PATENT DOCUMENTS

| JP | 2004-109585 | 4/2004 |
| JP | 2004-191844 | 7/2004 |
| JP | 2004-294829 | 10/2004 |
| JP | 2006-154517 | 6/2006 |
| JP | 2007-322478 | 12/2007 |
| JP | 2008-309999 | 4/2008 |

\* cited by examiner

*Primary Examiner* — Timothy J Thompson
(74) *Attorney, Agent, or Firm* — DLA Piper LLP (US)

(57) ABSTRACT

It is to provide an imaging lens that can improve optical performance while reducing size and weight.
An imaging lens includes, in order from an object side to an image surface side: a diaphragm 2, a first lens 3 having a positive power whose convex surface faces the object side, and a second lens 4 that is a meniscus lens having a negative power whose convex surface faces the object side, wherein a condition expressed by the following expression is to be satisfied: $0.4 \leq r_1/FL \leq 0.55$ (where, $r_1$: center radius curvature of the object side face 3a of the first lens, and FL: focal distance of the entire lens system).

7 Claims, 22 Drawing Sheets

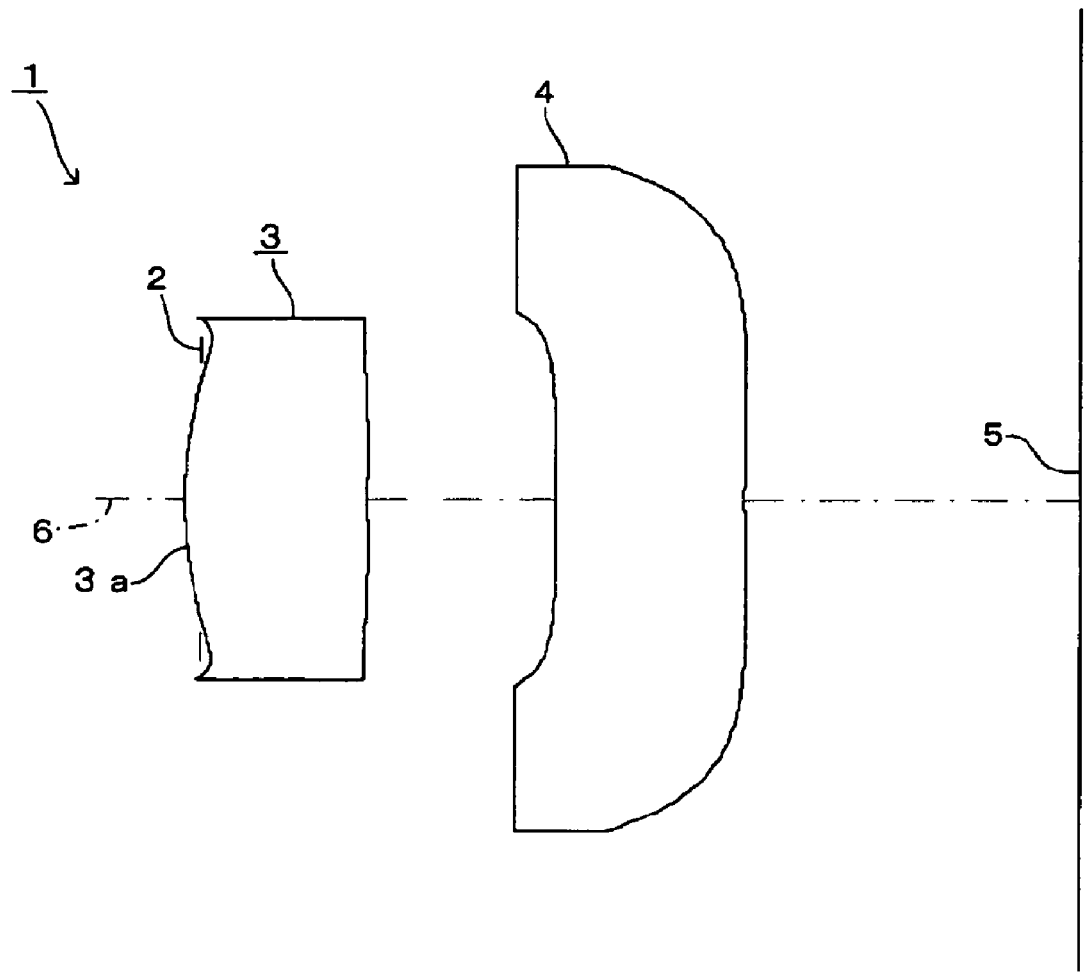
[Fig.1]

[Fig.2]
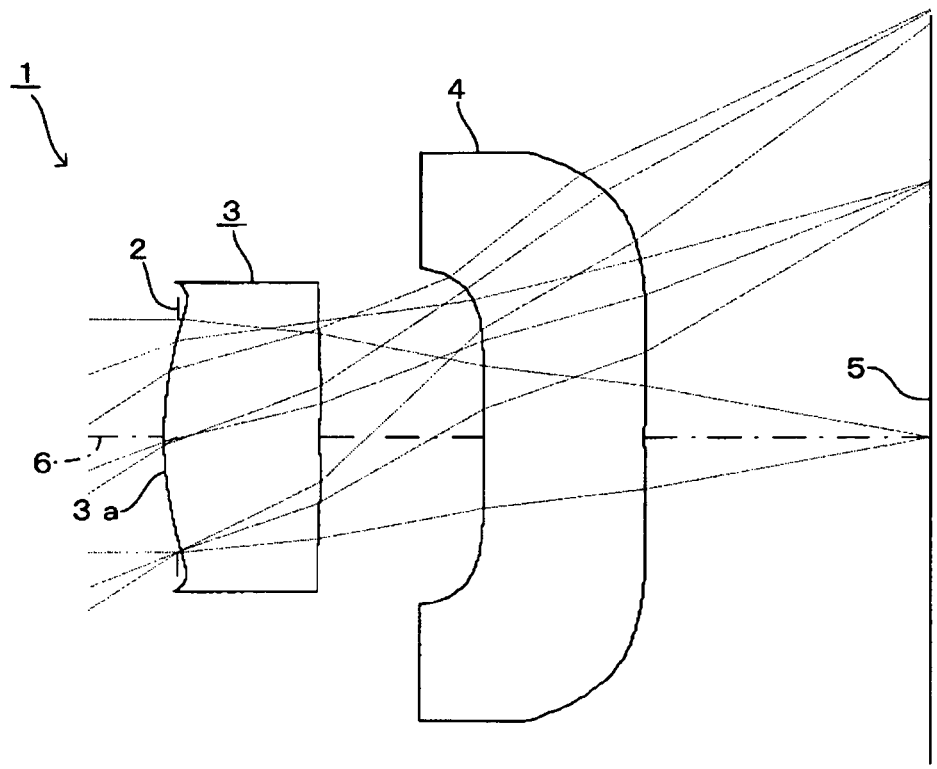
[Fig.3]
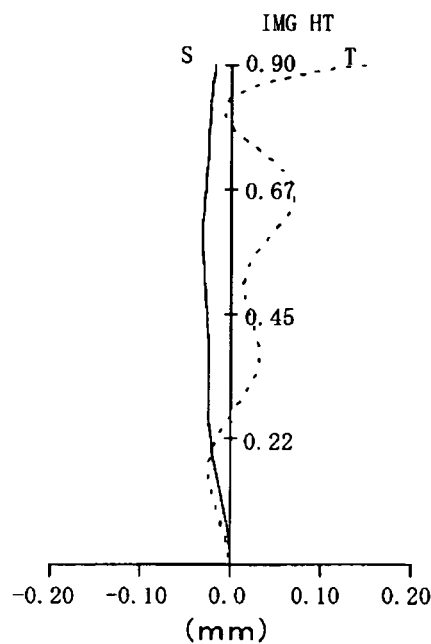
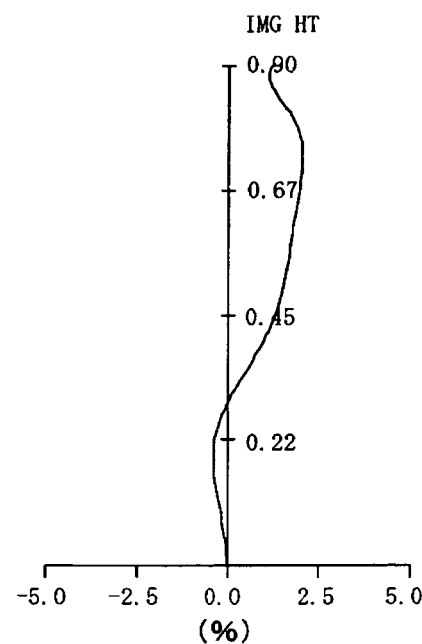

[Fig.4]
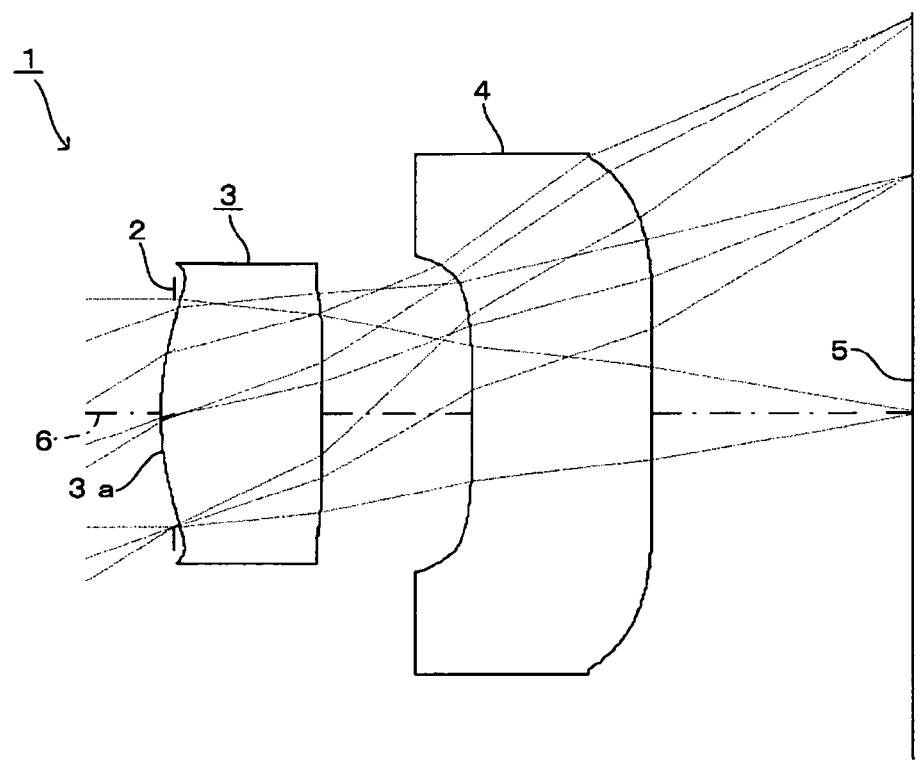
[Fig.5]
ASTIGMATISM
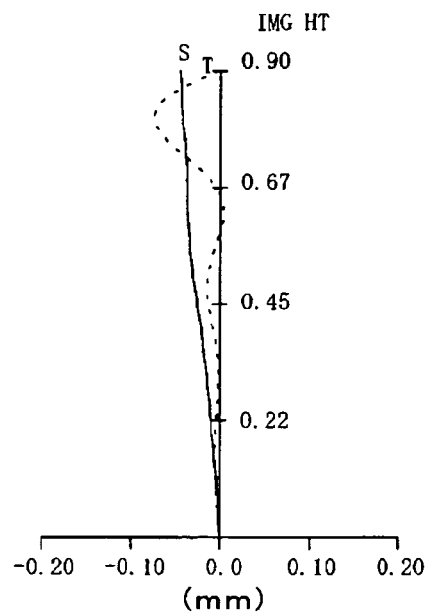
DISTORTION
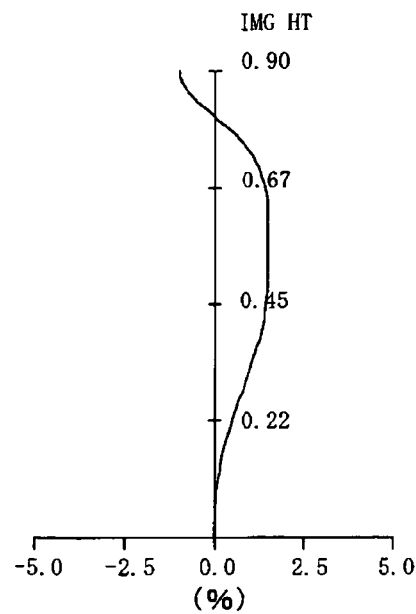

[Fig.6]
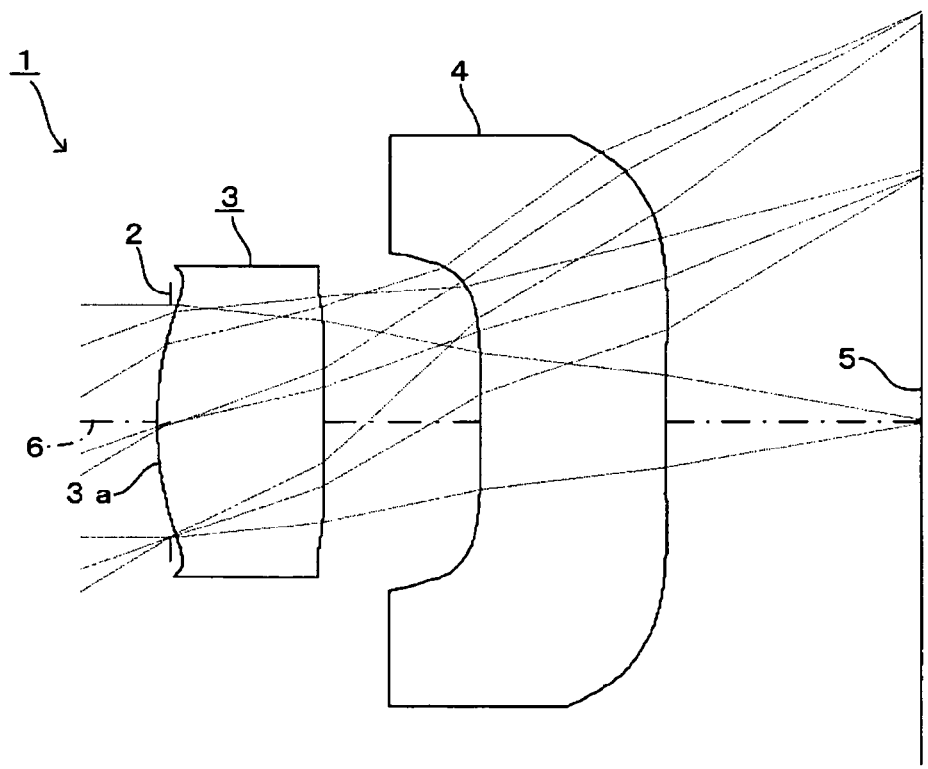
[Fig.7]
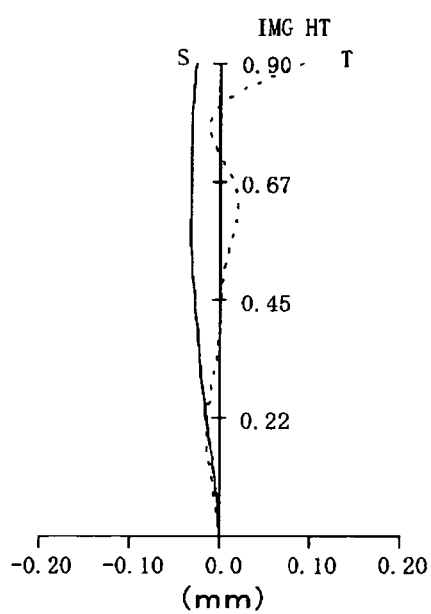
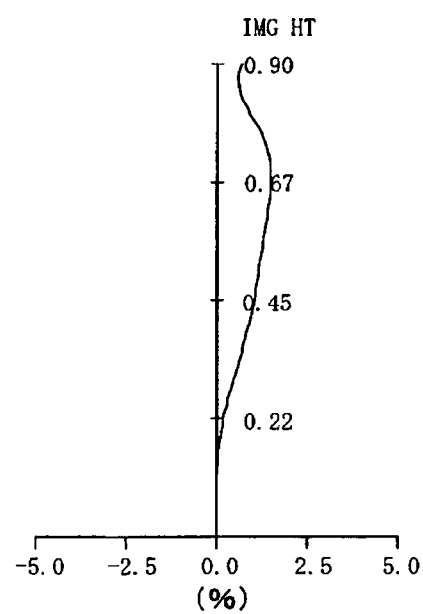

[Fig.8]
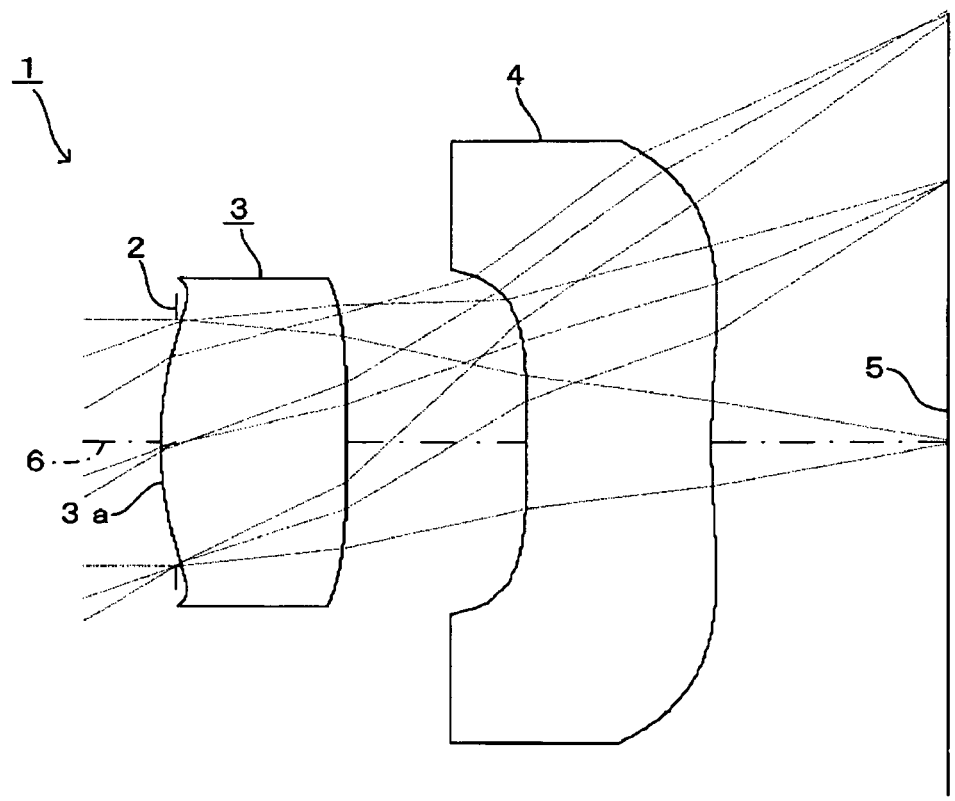
[Fig.9]
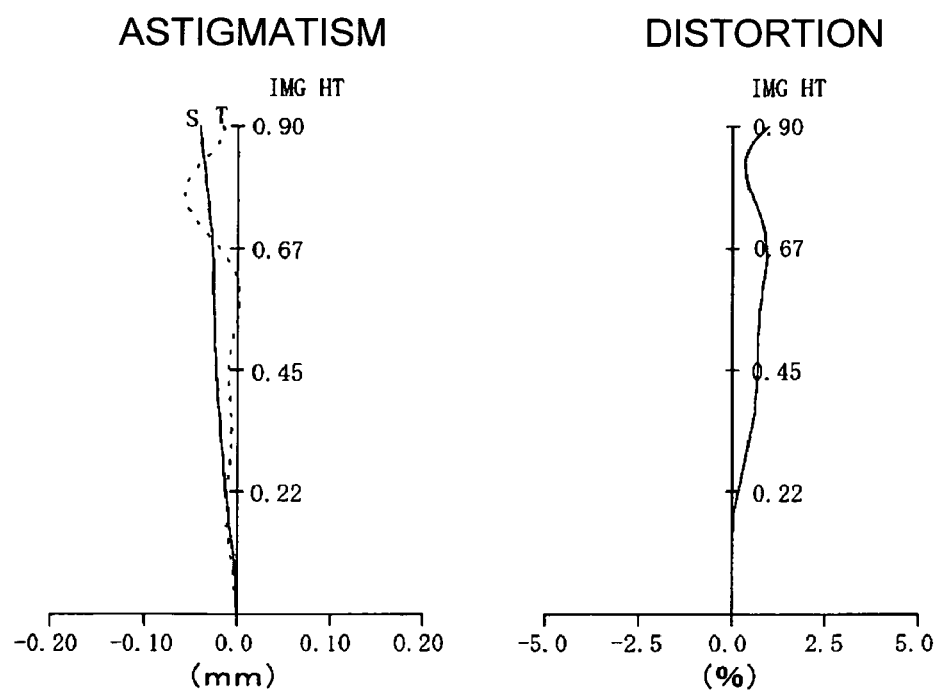

[Fig. 10]
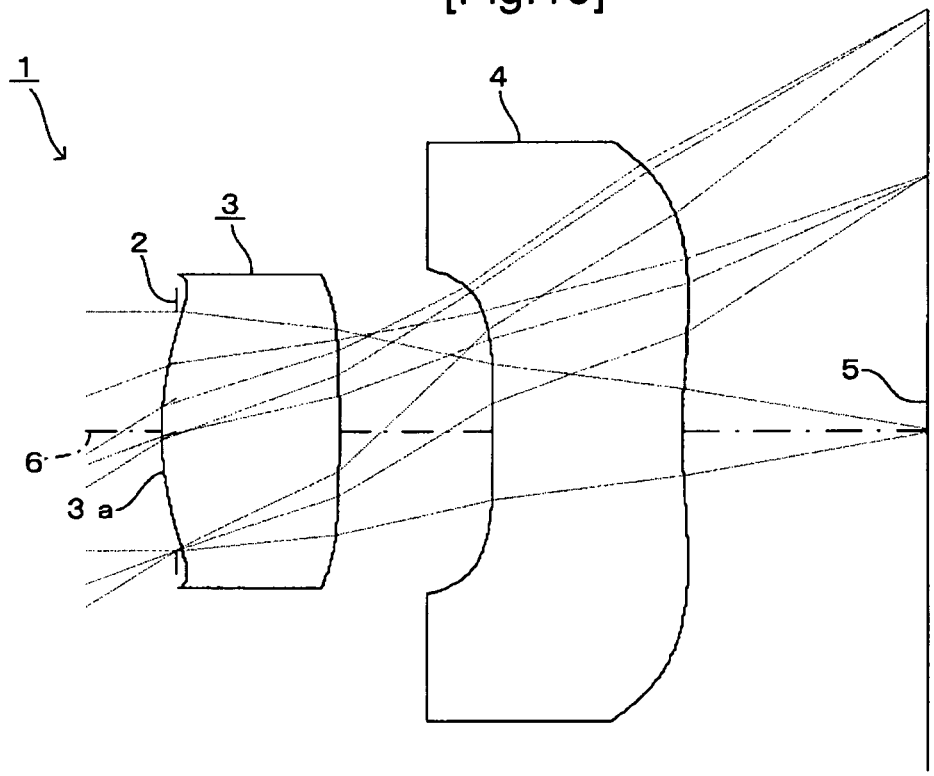
[Fig. 11]
ASTIGMATISM
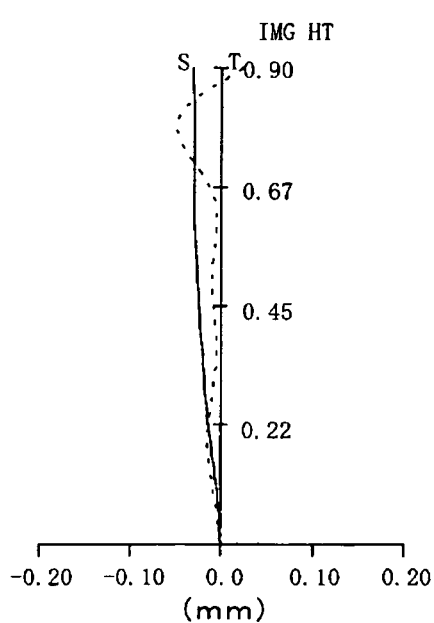
DISTORTION
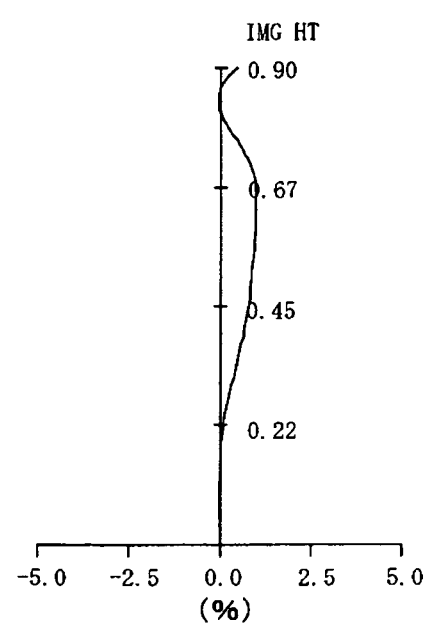

[Fig. 12]
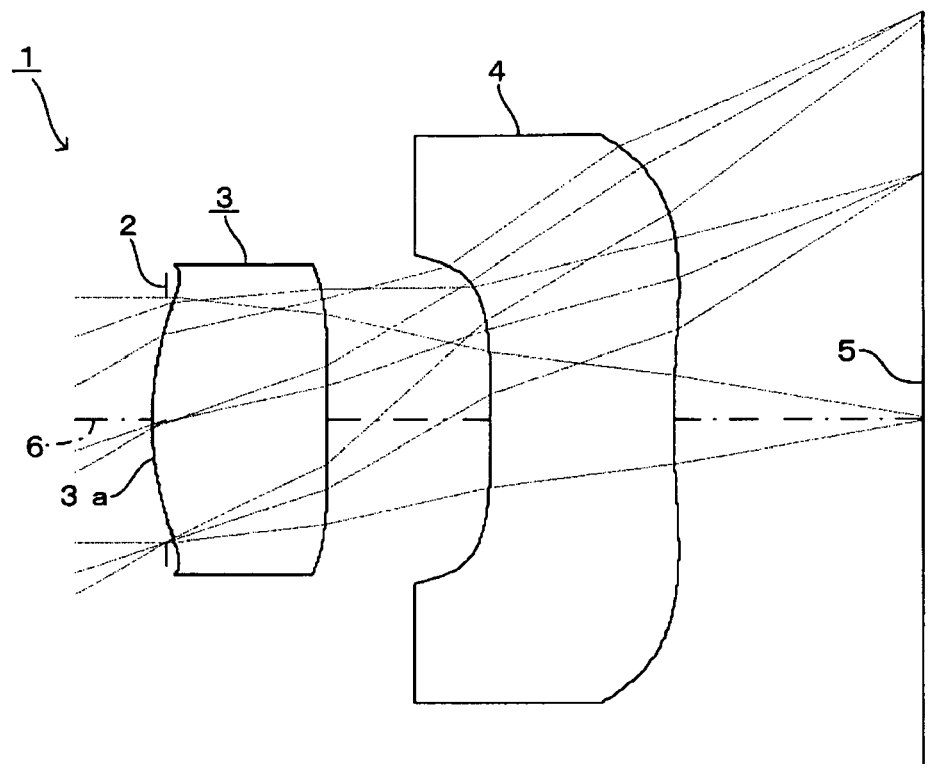
[Fig. 13]
ASTIGMATISM
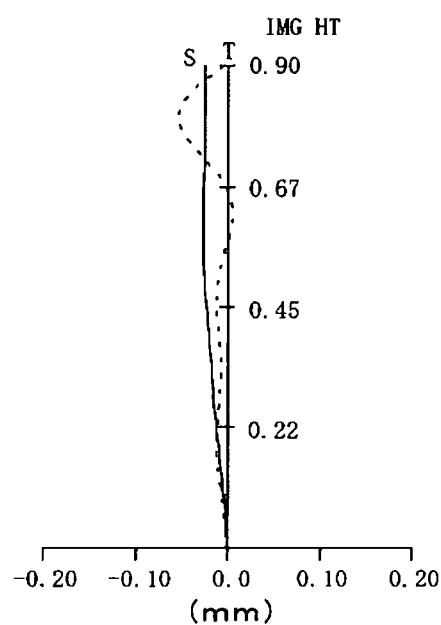
DISTORTION
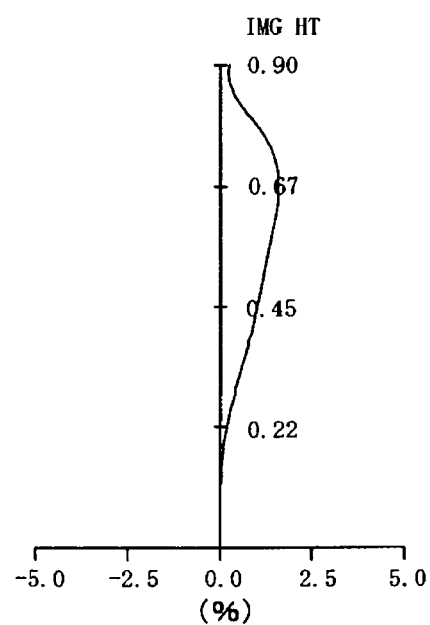

[Fig.14]
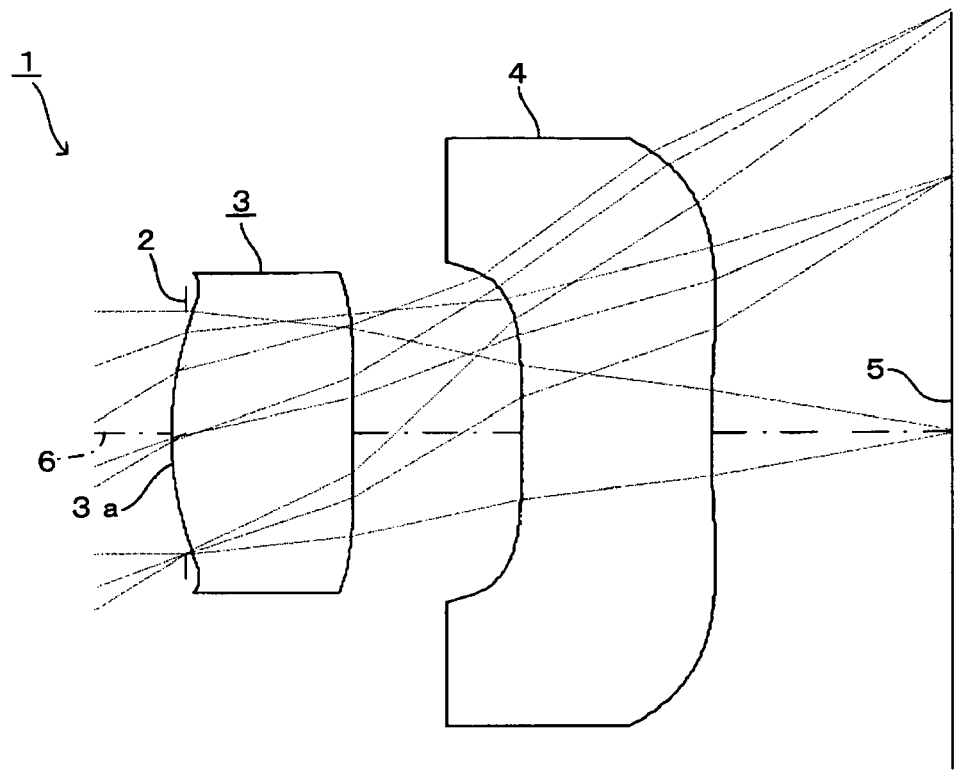
[Fig.15]
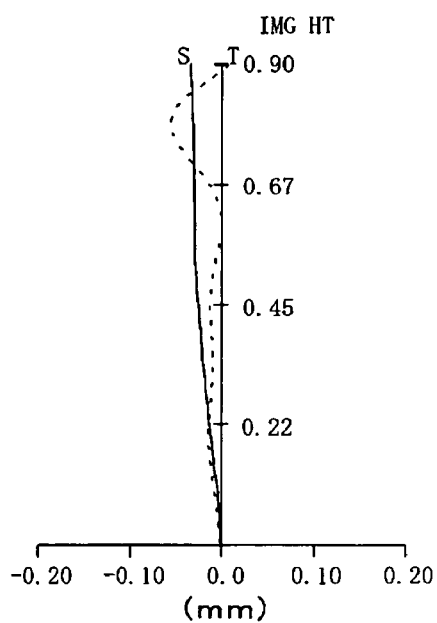
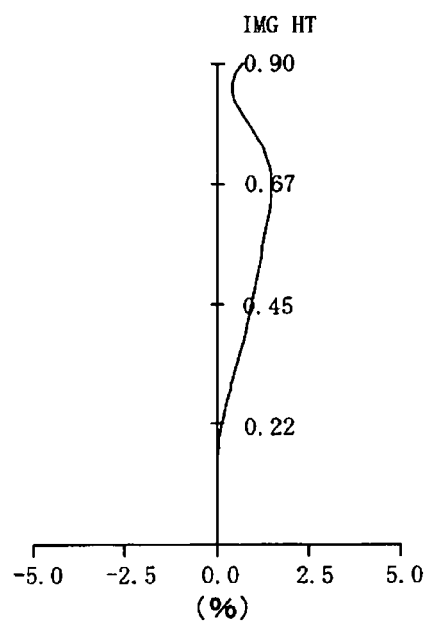

[Fig.16]
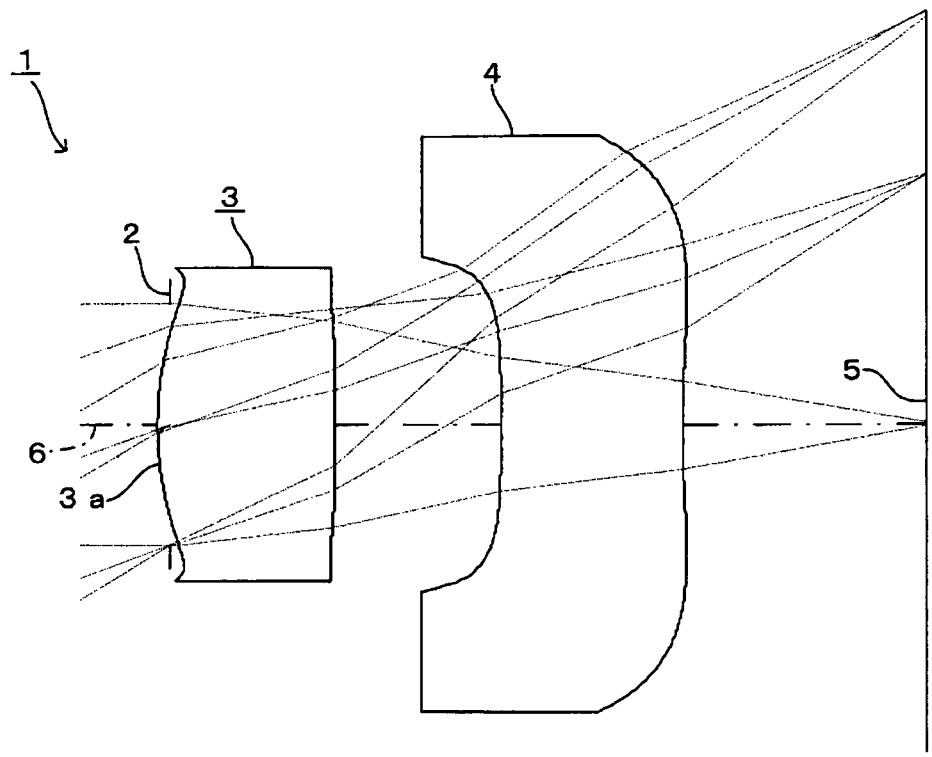
[Fig.17]
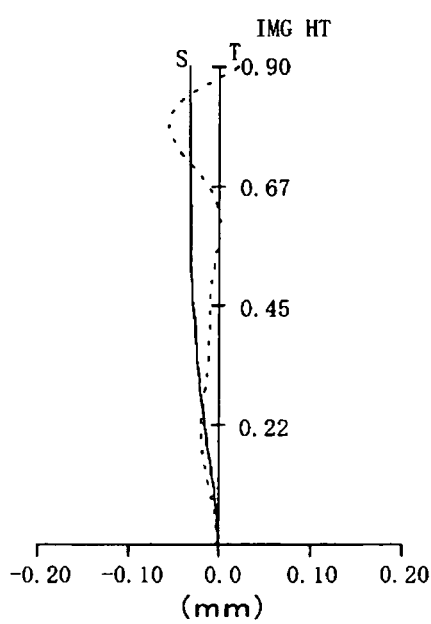
ASTIGMATISM
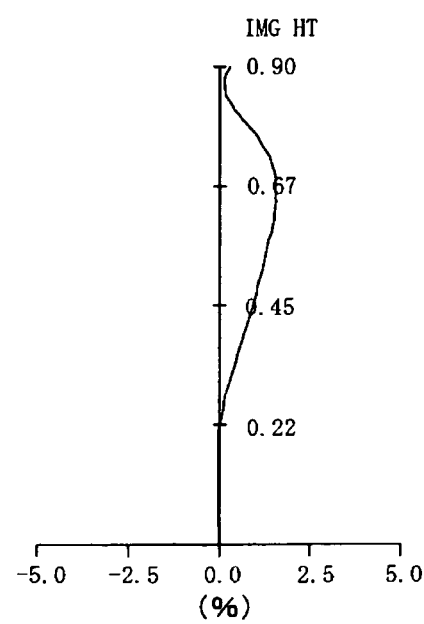
DISTORTION

[Fig.18]
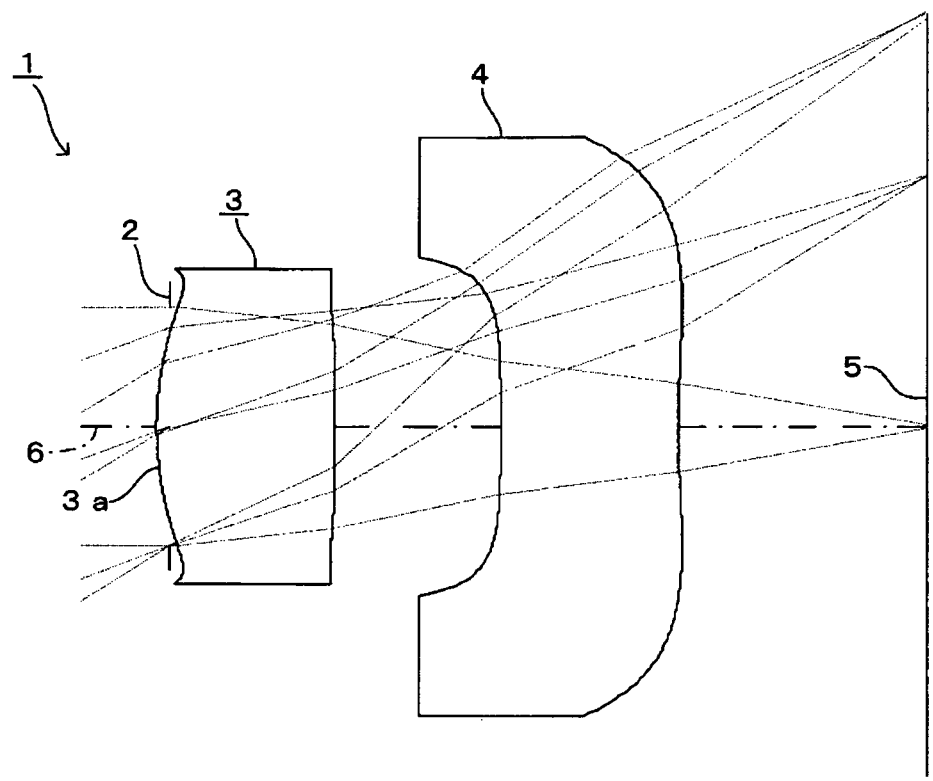
[Fig.19]
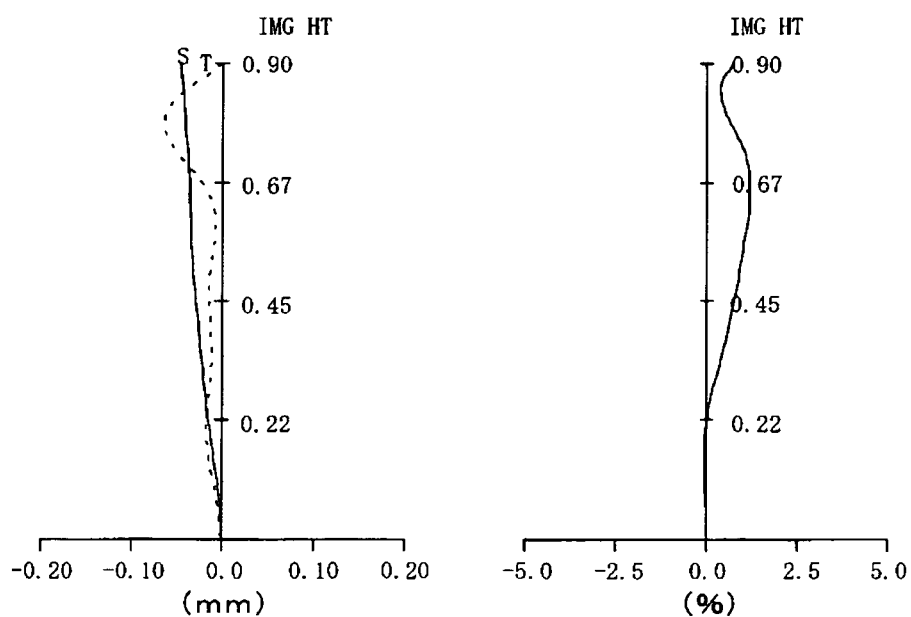

[Fig.20]
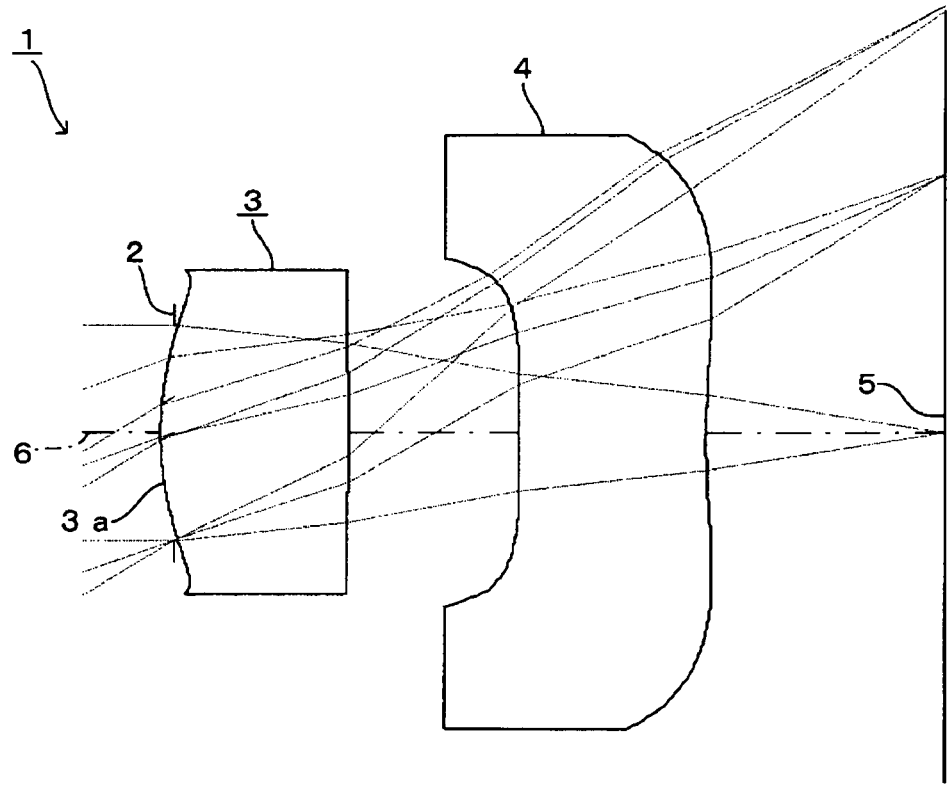
[Fig.21]
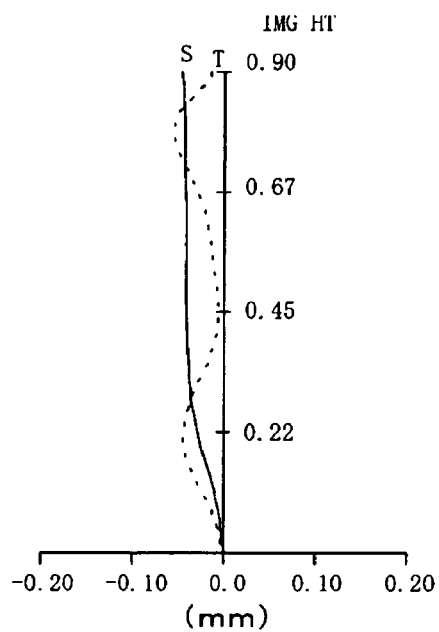
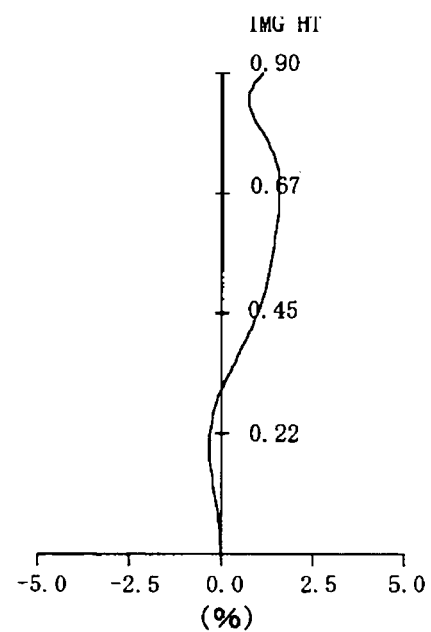

[Fig.22]
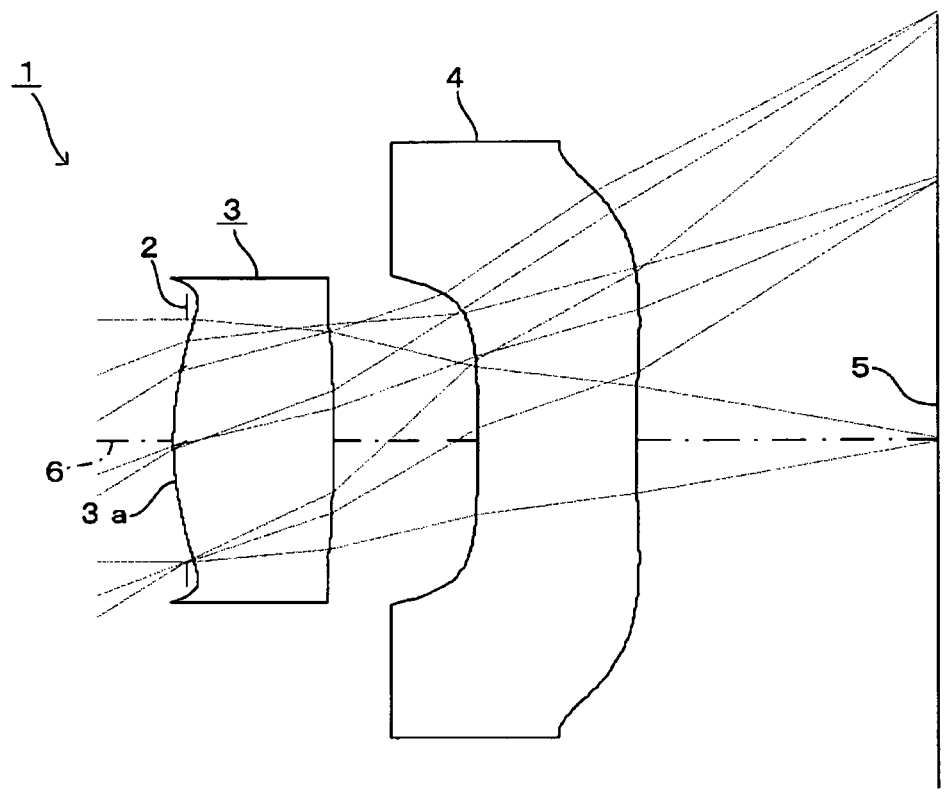
[Fig.23]
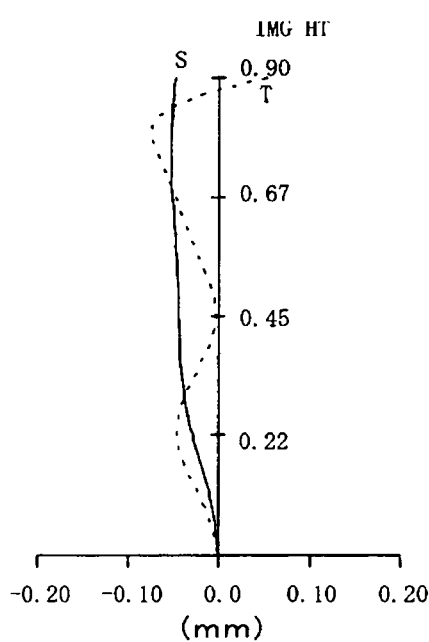
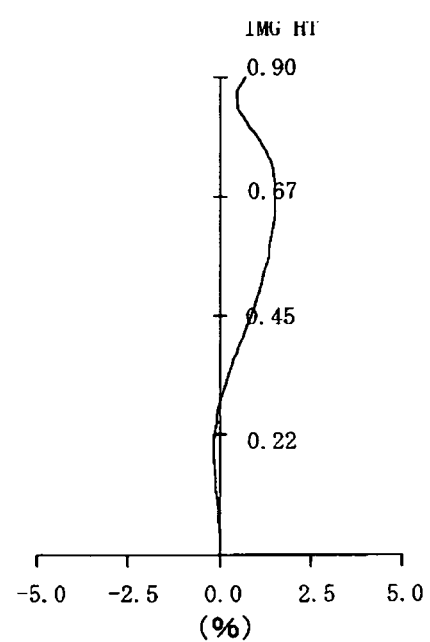

[Fig.24]
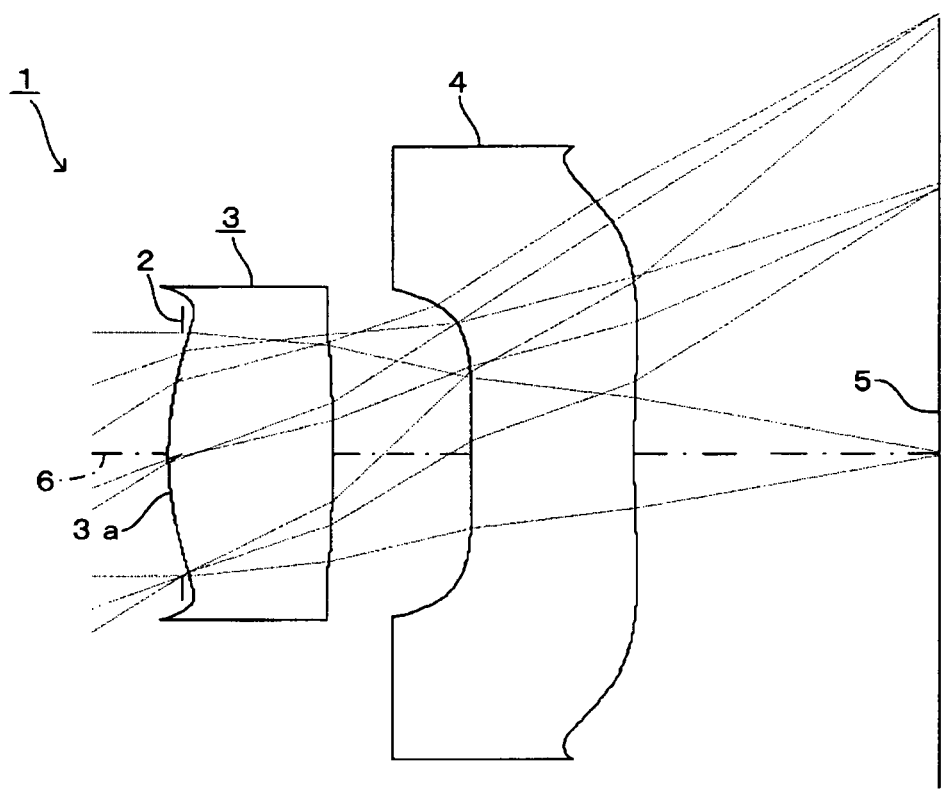
[Fig.25]
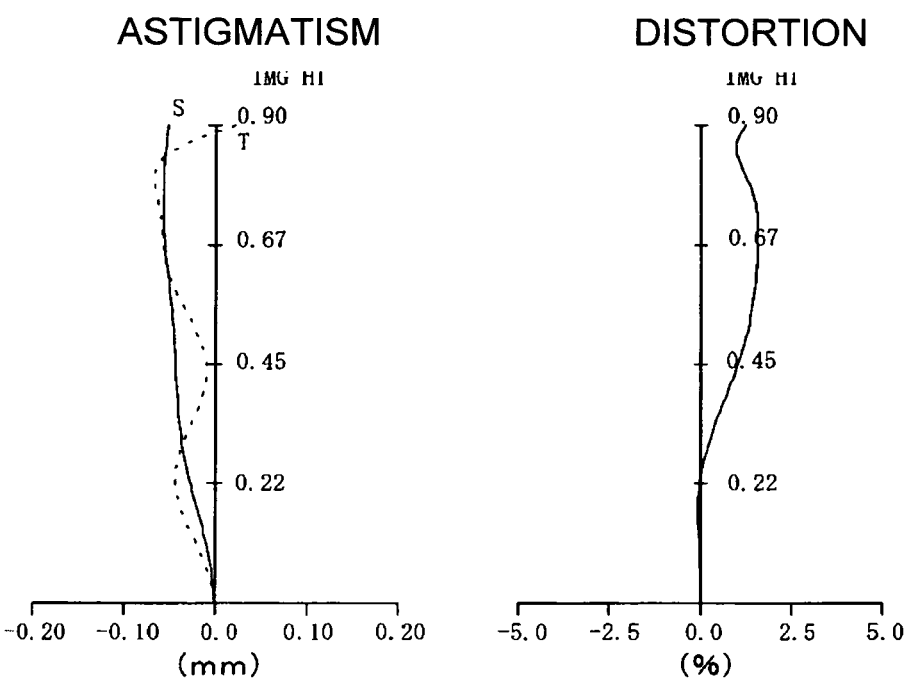

[Fig.26]
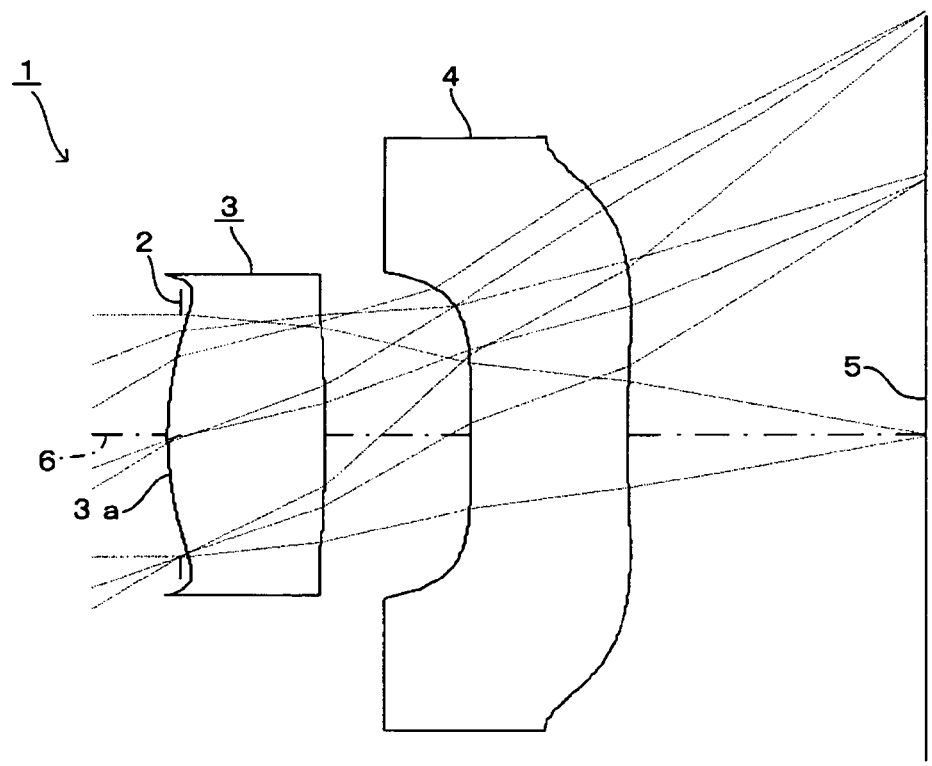
[Fig.27]
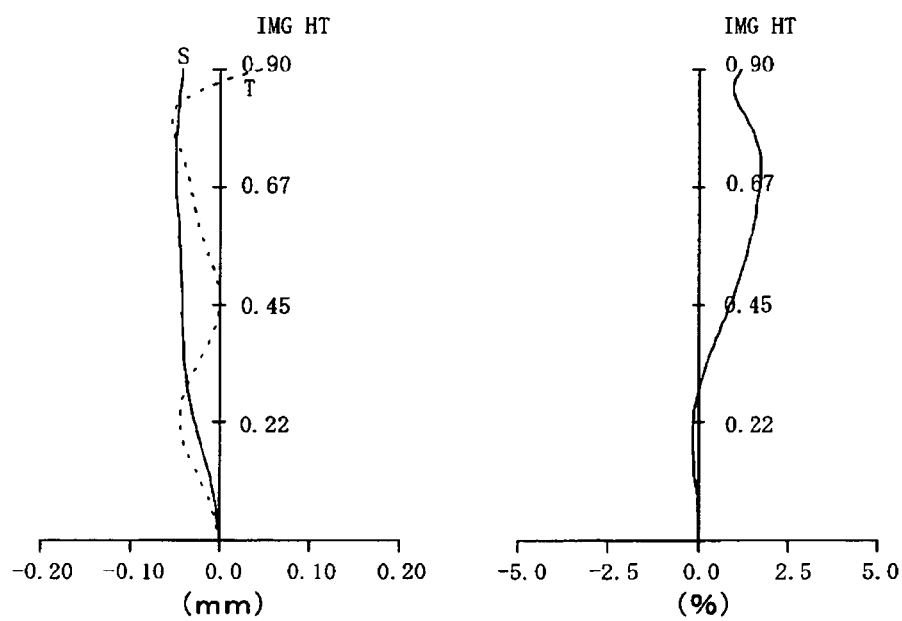

[Fig.28]
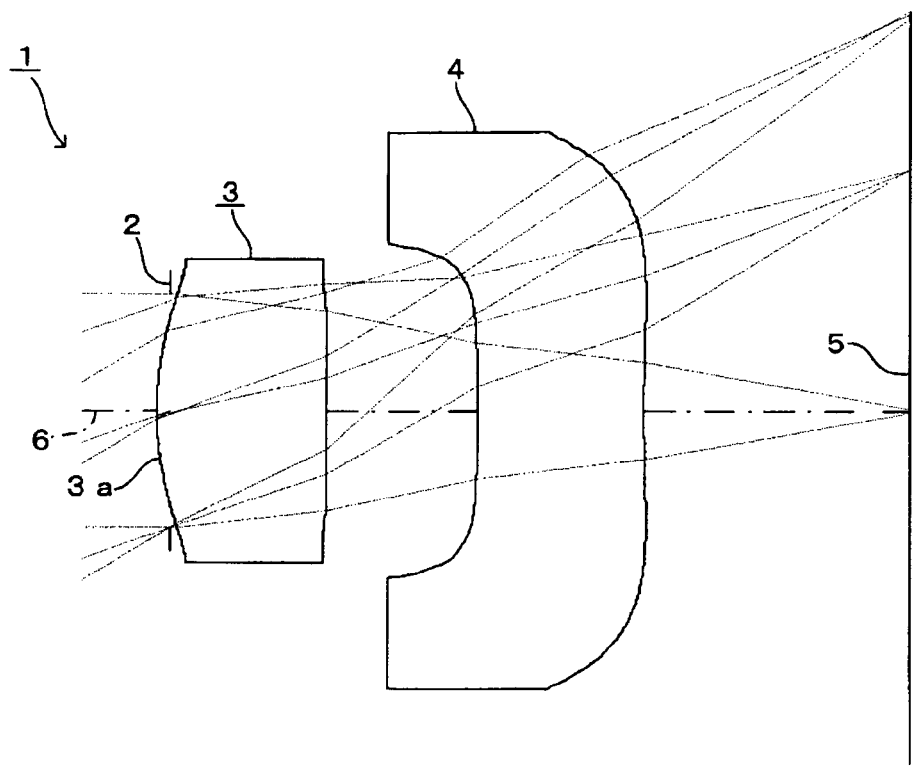
[Fig.29]
ASTIGMATISM
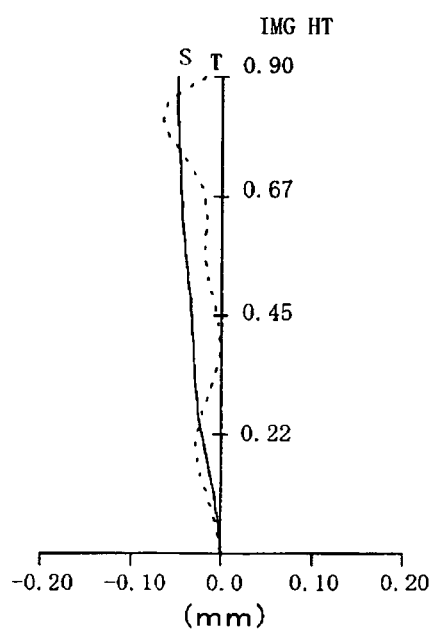
DISTORTION
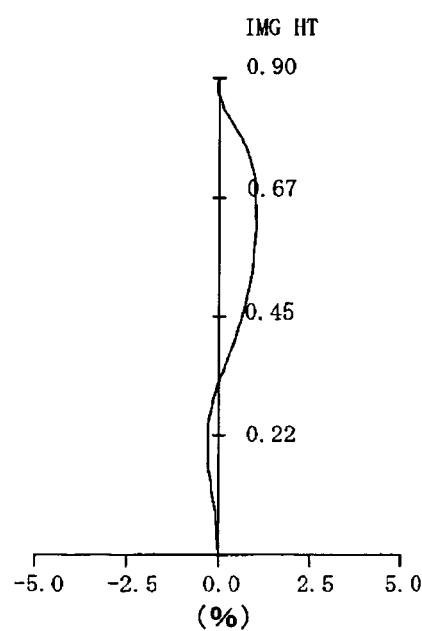

[Fig.30]
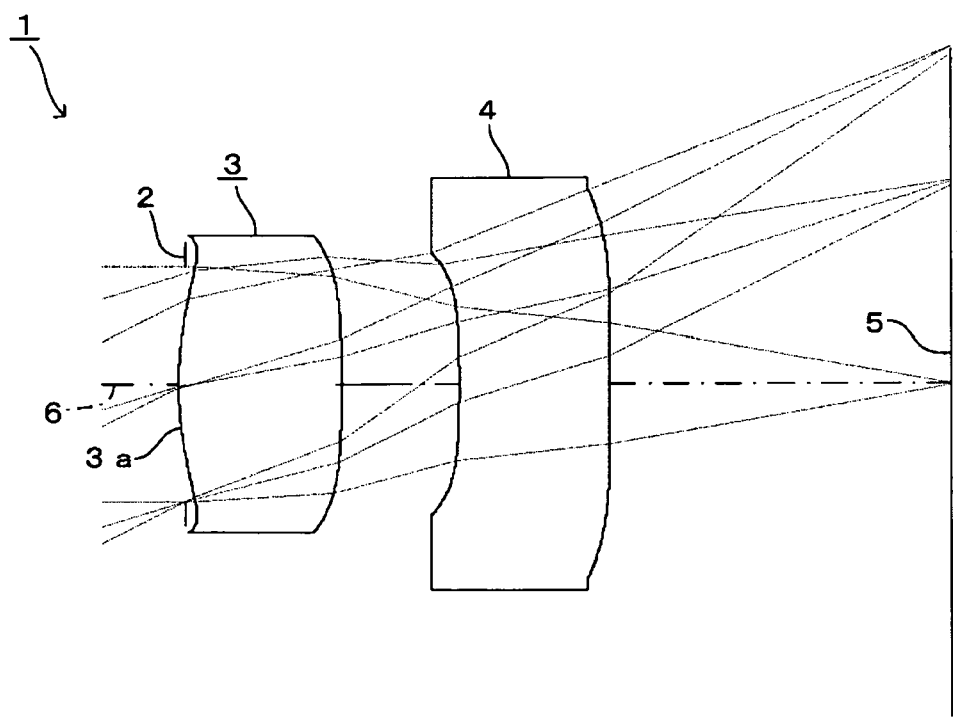
[Fig.31]
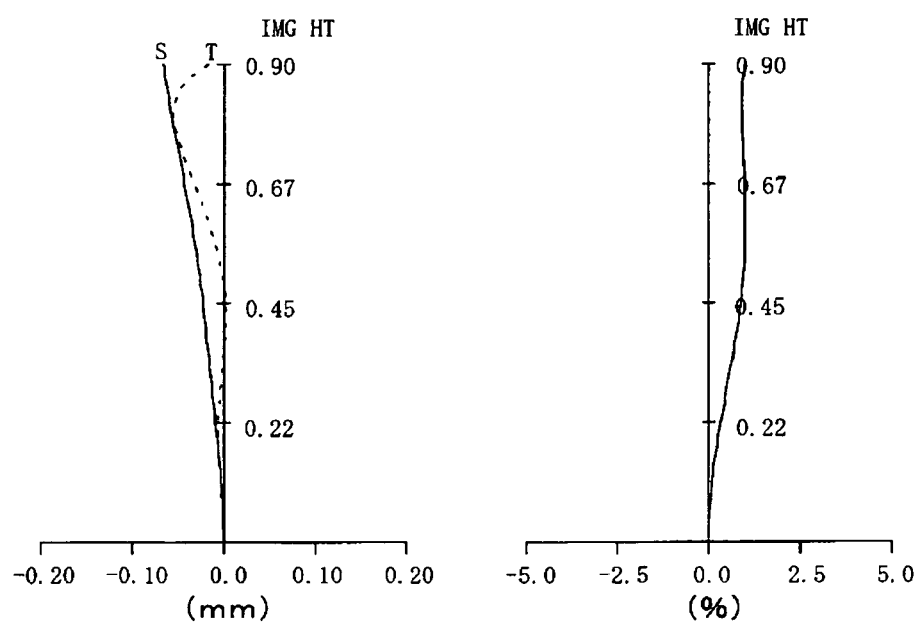

[Fig.32]
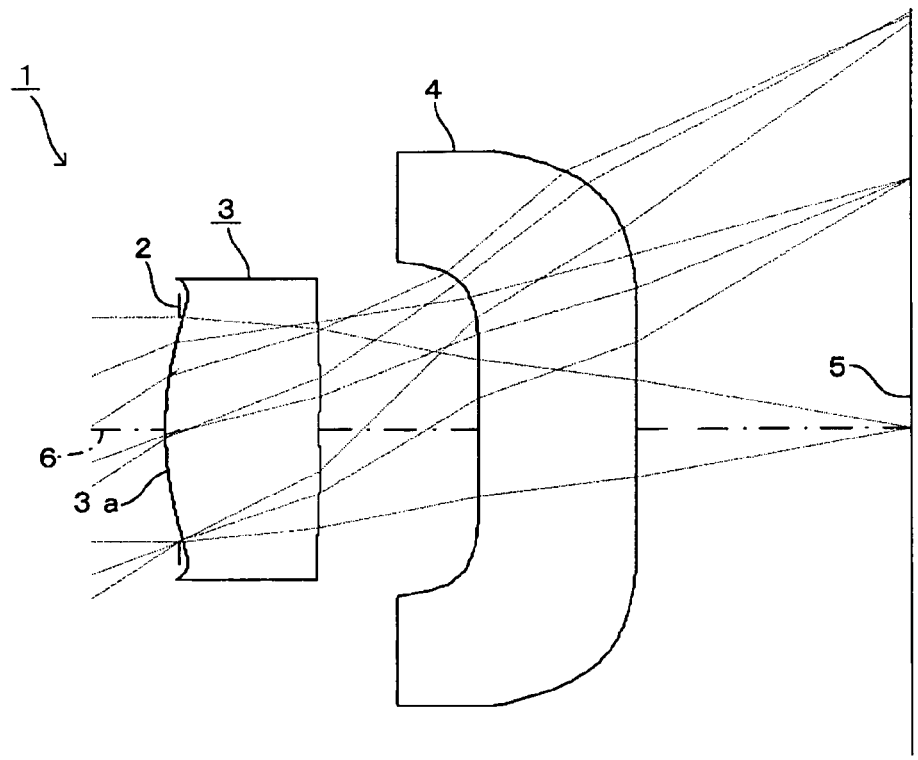
[Fig.33]
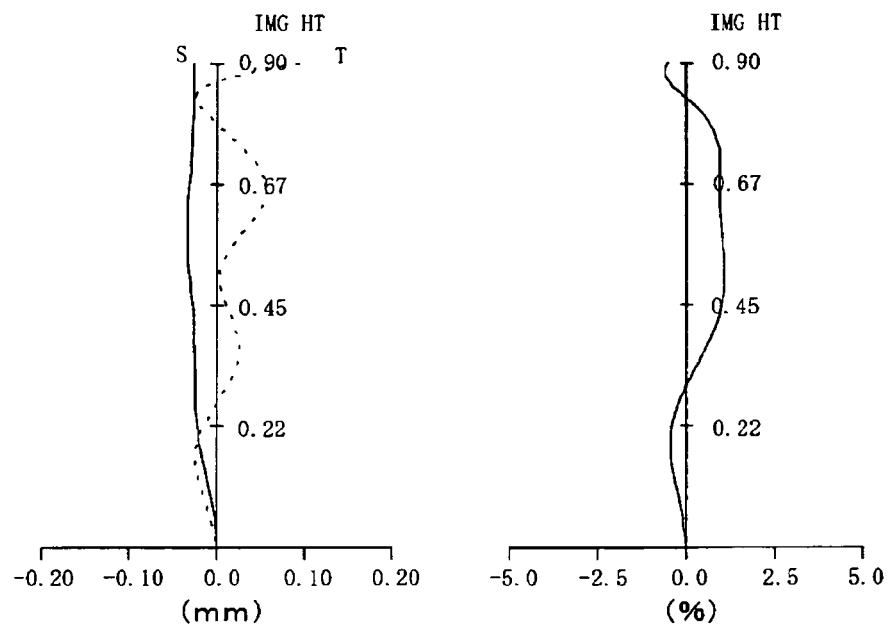

[Fig.34]
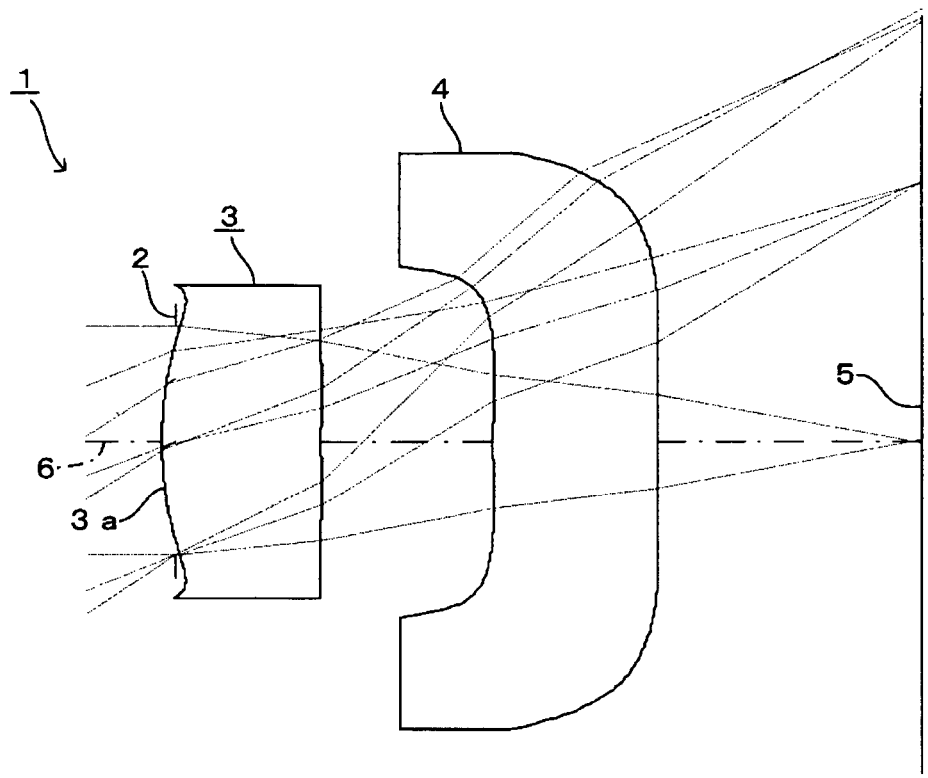
[Fig.35]
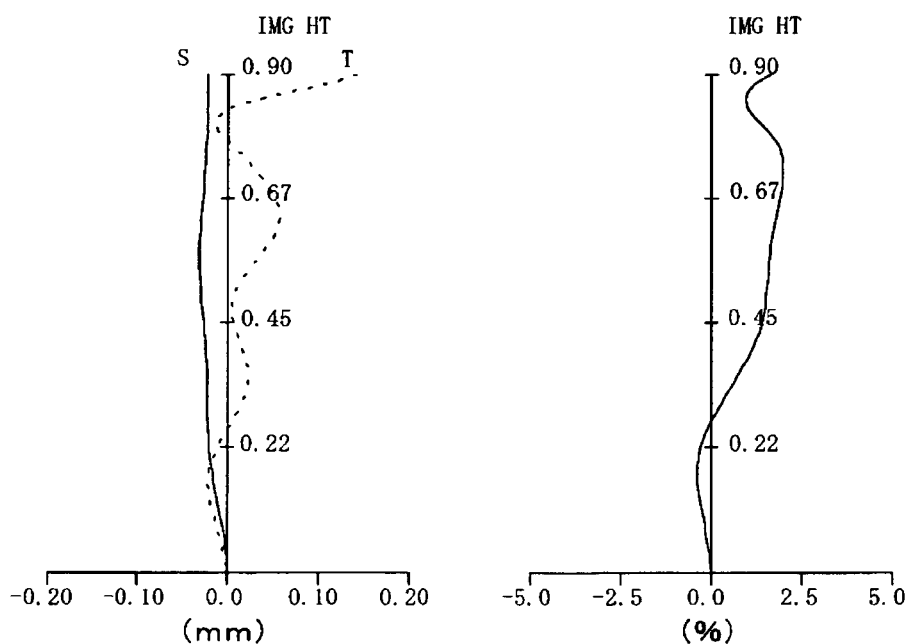

[Fig.36]
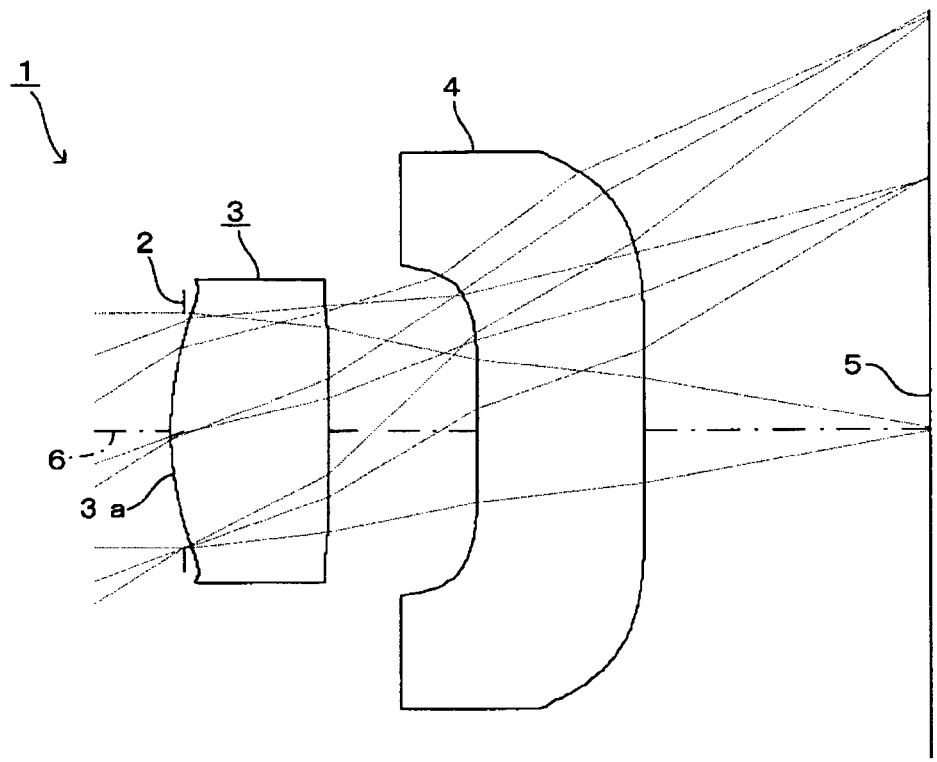
[Fig.37]
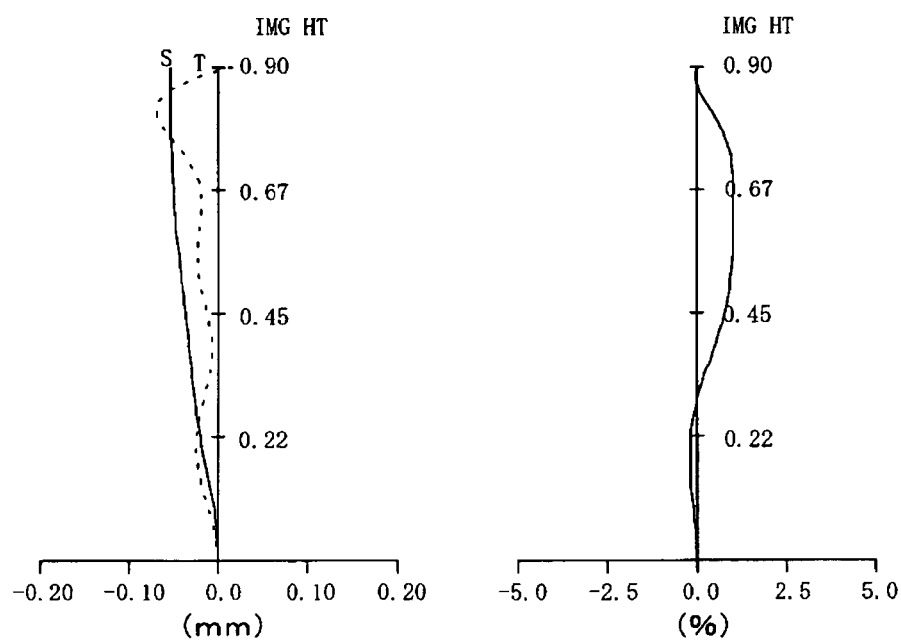

[Fig.38]
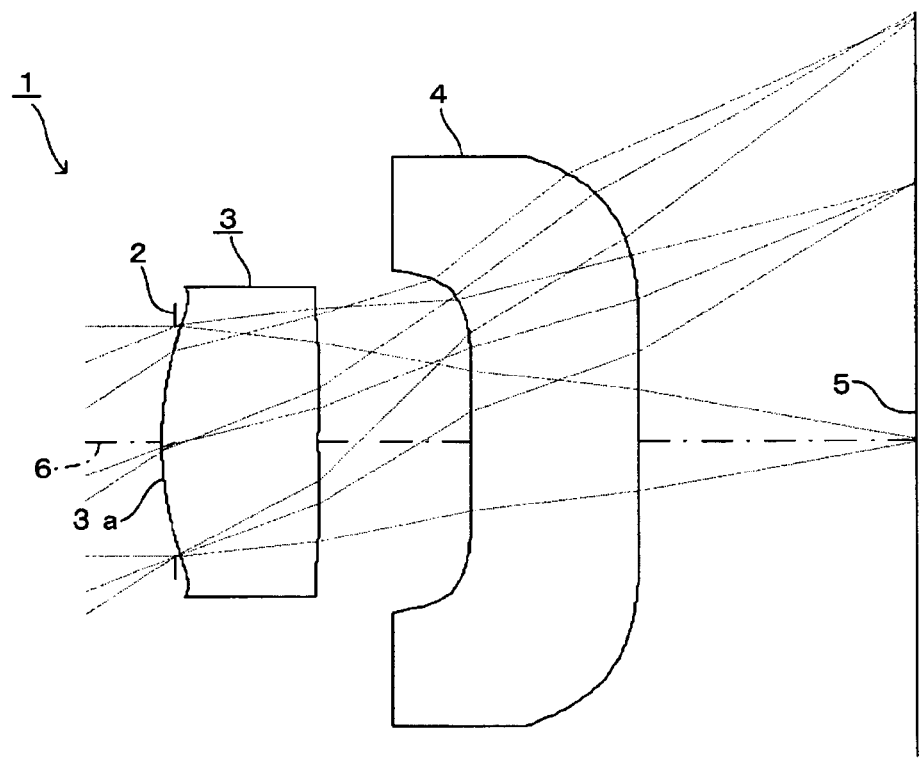
[Fig.39]
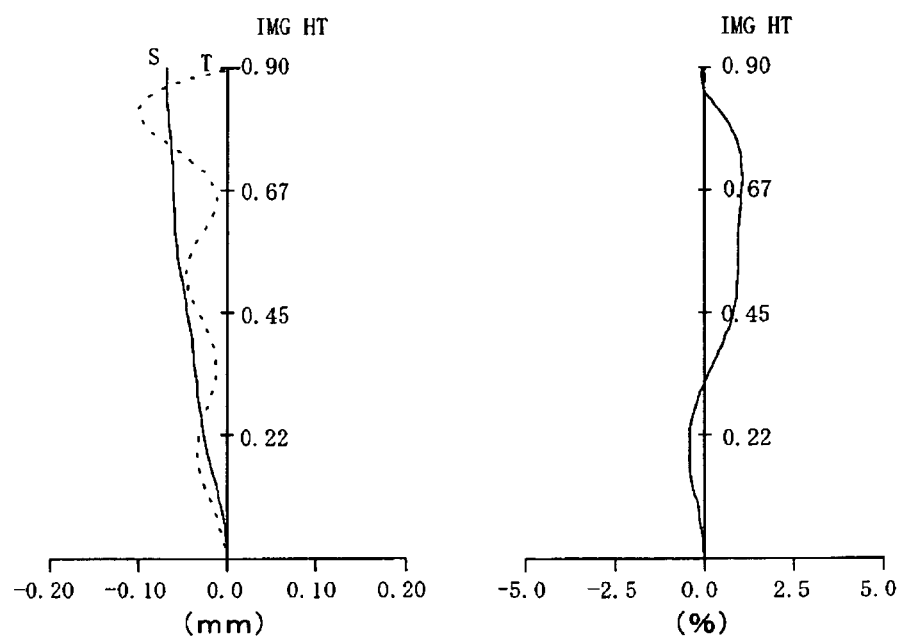

[Fig.40]
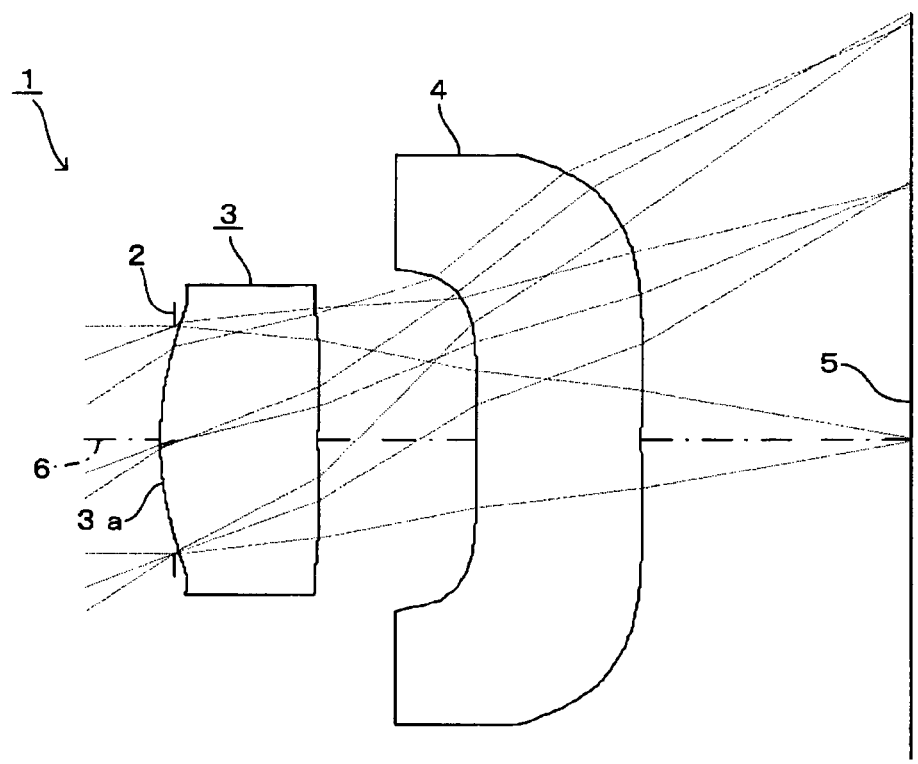
[Fig.41]
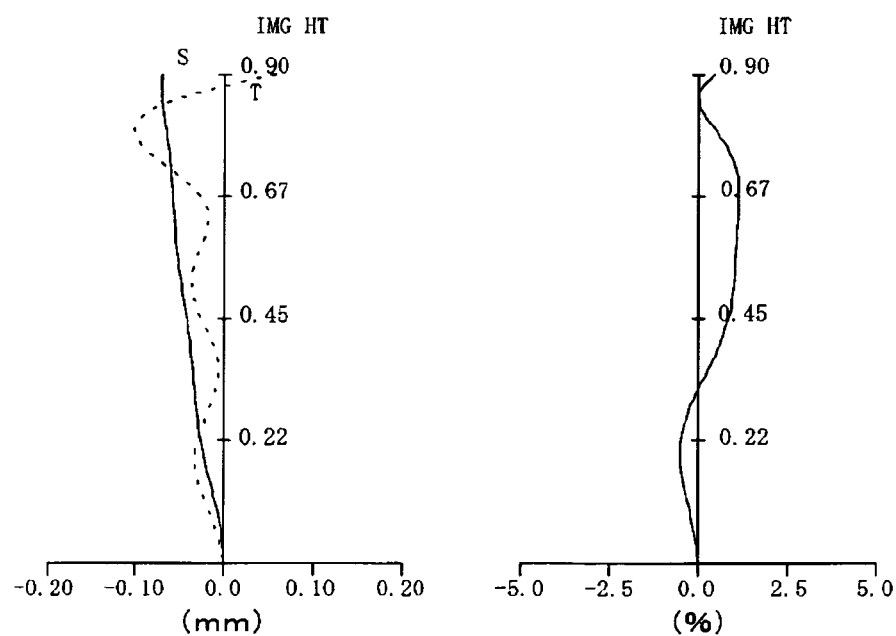

[Fig.42]
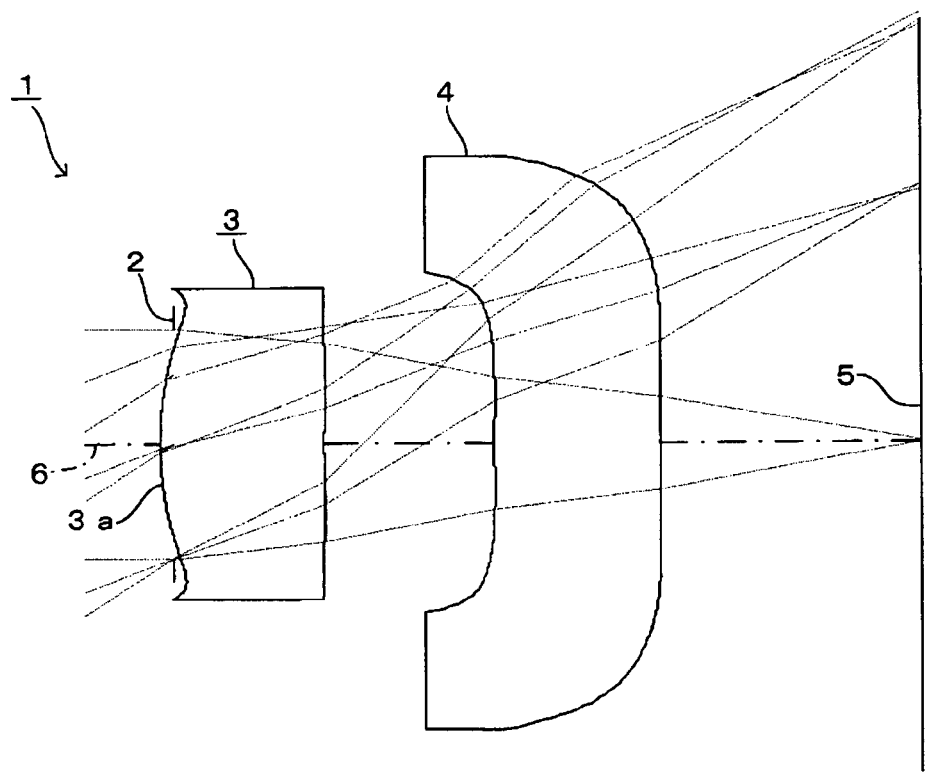
[Fig.43]
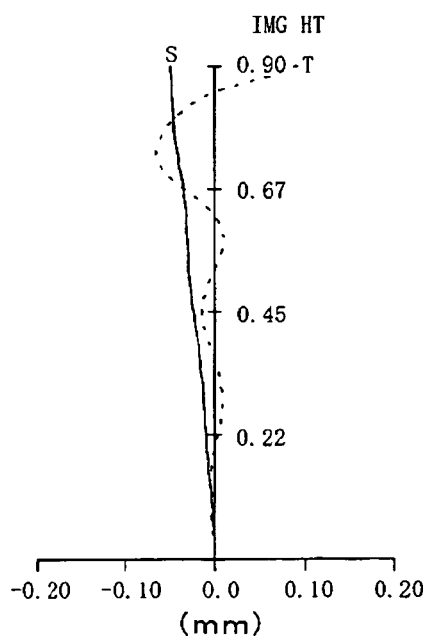
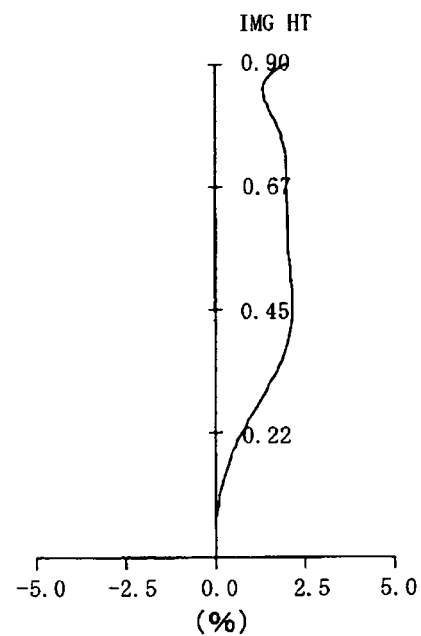

IMAGING LENS

BACKGROUND OF THE INVENTION

1. Field of the Invention

The present invention relates to an imaging lens. In particular, the present invention relates to an imaging lens of a two-lens structure that is capable of reducing size and weight and enhancing optical performance. The imaging lens is used for an image-taking device that forms an image of an object, such as scenery and human figures, on an image-taking surface of a solid image pickup element such as a CCD, CMOS, etc. The solid image pickup element is mounted on a portable computer, a television phone, a portable phone, and the like.

2. Description of the Related Art

Recently, there has been an increasing demand for cameras that utilize a solid image pickup element, such as a CCD, CMOS, or the like, which is mounted on a portable phone, a portable computer, and a television phone, for example. It is demanded that a camera such as this is small and light because the camera is required to be mounted on a limited installation space.

Further, in recent years, there has been an increasing demand for a high-optical-performance lens system capable of sufficiently utilizing resolution capabilities of a solid image pickup element having a high resolution exceeding one million pixels. Achieving a balance between size and weight reduction and improvement in optical performance is becoming increasingly important.

From this perspective, a two-lens structure lens system that is smaller and lighter than a three-lens structure lens system and superior to a single-lens structure lens system in optical performance is advantageous. Lens systems, such as those described in Patent Literatures 1 to 6, have been proposed as such two-lens structure lens systems.

[Patent Literature 1] Japanese Patent Unexamined Publication No. 2004-294829

[Patent Literature 2] Japanese Patent Publication No. 4071817

[Patent Literature 3] Japanese Patent Unexamined Publication No. 2004-109585((Especially, see FIRST and SECOND EXAMPLES)

[Patent Literature 4] Japanese Patent Unexamined Publication No. 2004-191844(Especially, see THIRD EXAMPLE)

[Patent Literature 5] Japanese Patent Unexamined Publication No. 2006-154517

[Patent Literature 6] Japanese Patent Unexamined Publication No. 2007-322478(Especially, see FIFTH EXAMPLE)

DISCLOSURE OF THE INVENTION

However, the lens system described in Patent Literature 1 is problematic in that ensuring sufficient telecentricity is difficult because the diaphragm is disposed between the first lens and the second lens.

The lens system described in Patent Literature 2 is problematic in that effectively correcting various aberrations while achieving size and weight reduction is difficult because the second lens is a biconcave lens.

The lens systems described in Patent Literature 3 to Patent Literature 6 are problematic in that balance among size and weight reduction, improvement in optical performance, and improvement in productivity is difficult to achieve because a value obtained by a center radius curvature of a surface of the first lens on an object side being divided by a focal distance of the overall lens system is not set to a suitable value.

Productivity, herein, means not only the productivity for mass-producing the imaging lens (such as moldability and cost when the imaging lens is mass-produced by injection molding), but also easiness of processing, manufacture, etc. of equipment used for manufacturing the imaging lens (such as easiness of processing a mold used for injection molding) (the same applies hereinafter).

The present invention has been achieved in light of the above-described problems. An object of the invention is to provide an imaging lens having improved optical performance and improved productivity while being reduced in size and weight.

SUMMARY OF THE INVENTION

In order to achieve the aforementioned object, an imaging lens according to a first aspect of the present invention is an imaging lens used for forming an image of an object on an image-taking surface of an image sensor element including, in order from an object side to an image surface side: a diaphragm, a first lens having a positive power whose convex surface faces the object side, and a second lens that is a meniscus lens having a negative power whose convex surface faces the object side, wherein a condition expressed by the following expression (1) is to be satisfied:

$$0.4 \leq r_1/FL \leq 0.55 \quad (1)$$

where, $r_1$: center radius curvature of the object side face of the first lens

FL: focal distance of the entire lens system.

In the invention, when the diaphragm is disposed closest to the object side, positioning of the diaphragm in a same position in an optical axis direction as a point on the optical axis (referred to, hereinafter, as a surface apex) of a surface (convex surface) of the first lens on the object side cannot be avoided. In addition, the surface apex and surrounding area of the surface of the first lens on the object side passing through the diaphragm and being positioned (projecting) closer to the object side than the diaphragm cannot be avoided. Even in this instance, because the diaphragm is physically positioned closer to the object side than the overall first lens, the configuration does not depart from the description in the scope of claims. To reduce the size of the optical system, the diaphragm is preferably positioned closer to the image surface side than the surface apex of the surface of the first lens on the object side.

In the invention according to the first aspect, the diaphragm is disposed closest to the object side. The first lens is a positive lens whose convex surface faces the object side. The second lens is a negative meniscus lens whose convex surface faces the object side. The second lens is a negative lens whose concave surface faces the object side. In addition, the condition expressed by the expression (1) is satisfied. Therefore, telecentricity can be ensured, various aberrations can be effectively corrected, and optical performance can be improved while achieving size and weight reduction. Furthermore, productivity can be improved.

An imaging lens according to a second aspect is the imaging lens according to the first aspect in which a condition expressed by a following expression (2) is further satisfied:

$$0.8 \leq f_1/FL \leq 1.1 \quad (2)$$

where, $f_1$: focal distance of the first lens.

In the invention according to the second aspect, the expression (2) is further satisfied. Therefore, both size and weight reduction and improvement in optical performance can be achieved with further certainty.

An imaging lens according to a third aspect is the imaging lens according to the first aspect in which a condition expressed by a following expression (3) is further satisfied:

$$0.7 \leq d_2/d_1 \leq 1.2 \quad (3)$$

where, $d_1$: center thickness of the first lens $d_2$: distance between the first lens and the second lens on the optical axis.

In the invention according to the third aspect, the expression (3) is further satisfied. Therefore, a means for effectively blocking unnecessary light can be appropriately employed while improving productivity.

An imaging lens according to a fourth aspect is the imaging lens according to the first aspect in which a condition expressed by a following expression (4) is further satisfied:

$$0.7 \leq d_2/d_3 \leq 1.2 \quad (4)$$

where, $d_2$: distance between the first lens and the second lens on the optical axis $d_3$: center thickness of the second lens.

In the invention according to the fourth aspect, the expression (4) is further satisfied. Therefore, a means for effectively blocking unnecessary light can be appropriately employed while improving productivity.

An imaging lens according to a fifth aspect is the imaging lens according to the first aspect in which a condition expressed by a following expression (5) is further satisfied:

$$0.1 \leq d_1/FL \leq 0.3 \quad (5)$$

where, $d_1$: center thickness of the first lens.

In the invention according to the fifth aspect, the expression (5) is further satisfied. Therefore, both size and weight reduction and improvement in productivity can be achieved with further certainty.

An imaging lens according to a sixth aspect is the imaging lens according to the first aspect in which a condition expressed by a following expression (6) is further satisfied:

$$0.1 \leq d_3/FL \leq 0.3 \quad (6)$$

where, $d_3$: center thickness of the second lens.

In the invention according to the sixth aspect, the expression (6) is further satisfied. Therefore, excellent balance can be further achieved between size and weight reduction and improvement in productivity.

An imaging lens according to a seventh aspect is the imaging lens according to the first aspect in which a condition expressed by a following expression (7) is further satisfied:

$$0.9 \leq L/FL \leq 1.25 \quad (7)$$

where,

L: overall length of the lens system (distance from the surface closest to the object side to the image-taking surface on the optical axis: equivalent air length).

In the invention according to the seventh aspect, the expression (7) is further satisfied. Therefore, excellent balance can be further achieved between size and weight reduction and improvement in productivity.

EFFECTS OF THE INVENTION

In the imaging lens of the present invention, optical performance and productivity can be improved while achieving size and weight reduction.

BRIEF DESCRIPTION OF THE DRAWINGS

FIG. 1 is a schematic diagram for showing an embodiment of the imaging lens according to the present invention;

FIG. 2 is a schematic diagram for showing FIRST EXAMPLE of the imaging lens according to the present invention;

FIG. 3 shows graphs for describing the astigmatism and distortion of the imaging lens shown in FIG. 2;

FIG. 4 is a schematic diagram for showing SECOND EXAMPLE of the imaging lens according to the present invention;

FIG. 5 shows graphs for describing the astigmatism and distortion of the imaging lens shown in FIG. 4;

FIG. 6 is a schematic diagram for showing THIRD EXAMPLE of the imaging lens according to the present invention;

FIG. 7 shows graphs for describing the astigmatism and distortion of the imaging lens shown in FIG. 6;

FIG. 8 is a schematic diagram for showing FOURTH EXAMPLE of the imaging lens according to the present invention;

FIG. 9 shows graphs for describing the astigmatism and distortion of the imaging lens shown in FIG. 8;

FIG. 10 is a schematic diagram for showing FIFTH EXAMPLE of the imaging lens according to the present invention;

FIG. 11 shows graphs for describing the astigmatism and distortion of the imaging lens shown in FIG. 10;

FIG. 12 is a schematic diagram for showing SIXTH EXAMPLE of the imaging lens according to the present invention;

FIG. 13 shows graphs for describing the astigmatism and distortion of the imaging lens shown in FIG. 12;

FIG. 14 is a schematic diagram for showing SEVENTH EXAMPLE of the imaging lens according to the present invention;

FIG. 15 shows graphs for describing the astigmatism and distortion of the imaging lens shown in FIG. 14;

FIG. 16 is a schematic diagram for showing EIGHTH EXAMPLE of the imaging lens according to the present invention;

FIG. 17 shows graphs for describing the astigmatism and distortion of the imaging lens shown in FIG. 16;

FIG. 18 is a schematic diagram for showing NINTH EXAMPLE of the imaging lens according to the present invention;

FIG. 19 shows graphs for describing the astigmatism and distortion of the imaging lens shown in FIG. 18;

FIG. 20 is a schematic diagram for showing TENTH EXAMPLE of the imaging lens according to the present invention;

FIG. 21 shows graphs for describing the astigmatism and distortion of the imaging lens shown in FIG. 20;

FIG. 22 is a schematic diagram for showing ELEVENTH EXAMPLE of the imaging lens according to the present invention;

FIG. 23 shows graphs for describing the astigmatism and distortion of the imaging lens shown in FIG. 22;

FIG. 24 is a schematic diagram for showing TWELFTH EXAMPLE of the imaging lens according to the present invention;

FIG. 25 shows graphs for describing the astigmatism and distortion of the imaging lens shown in FIG. 24;

FIG. 26 is a schematic diagram for showing THIRTEENTH EXAMPLE of the imaging lens according to the present invention;

FIG. 27 shows graphs for describing the astigmatism and distortion of the imaging lens shown in FIG. 26;

FIG. 28 is a schematic diagram for showing FOURTEENTH EXAMPLE of the imaging lens according to the present invention;

FIG. 29 shows graphs for describing the astigmatism and distortion of the imaging lens shown in FIG. 28;

FIG. 30 is a schematic diagram for showing FIFTEENTH EXAMPLE of the imaging lens according to the present invention;

FIG. 31 shows graphs for describing the astigmatism and distortion of the imaging lens shown in FIG. 30;

FIG. 32 is a schematic diagram for showing SIXTEENTH EXAMPLE of the imaging lens according to the present invention;

FIG. 33 shows graphs for describing the astigmatism and distortion of the imaging lens shown in FIG. 32;

FIG. 34 is a schematic diagram for showing SEVENTEENTH EXAMPLE of the imaging lens according to the present invention;

FIG. 35 shows graphs for describing the astigmatism and distortion of the imaging lens shown in FIG. 34;

FIG. 36 is a schematic diagram for showing EIGHTEENTH EXAMPLE of the imaging lens according to the present invention;

FIG. 37 shows graphs for describing the astigmatism and distortion of the imaging lens shown in FIG. 36;

FIG. 38 is a schematic diagram for showing NINETEENTH EXAMPLE of the imaging lens according to the present invention;

FIG. 39 shows graphs for describing the astigmatism and distortion of the imaging lens shown in FIG. 38;

FIG. 40 is a schematic diagram for showing TWENTIETH EXAMPLE of the imaging lens according to the present invention;

FIG. 41 shows graphs for describing the astigmatism and distortion of the imaging lens shown in FIG. 40;

FIG. 42 is a schematic diagram for showing TWENTY FIRST EXAMPLE of the imaging lens according to the present invention;

FIG. 43 shows graphs for describing the astigmatism and distortion of the imaging lens shown in FIG. 42;

DETAILED DESCRIPTION OF THE PREFERRED EMBODIMENT

An embodiment of the imaging lens according to the present invention will be described hereinafter with reference to FIG. 1.

As shown in FIG. 1, an imaging lens 1 according to the embodiment includes, in order from an object side toward an image surface side, a diaphragm 2, a first lens 3 made of resin that is a lens having a positive power whose convex surface faces the object side, and a second lens 4 made of resin that is a meniscus lens having a negative power whose convex surface faces the object side.

Respective lens surfaces of the first lens 3 and the second lens 4 on the object side are referred to as a first face. Respective lens surfaces of the first lens 3 and the second lens 4 on the image surface side are referred to as a second face.

According to the embodiment, an image-taking surface 5 that is a light-receiving surface of an image sensor element, such as a charge-coupled device (CCD) or a complementary metal oxide semiconductor (CMOS), is disposed on the second face side of the second lens 4.

Various filters, such as a cover glass, an infrared (IR) cut filter, and a low-pass filter, may be disposed as required between the second face of the second lens 4 and the image-taking surface 5. The IR cut filter may be formed on any one lens surface, such as a second face of the first lens 3, or on a plurality of lens surfaces, among the lens surfaces of the first lens 3 and the second lens 4.

In this way, according to the embodiment, high telecentricity can be ensured as a result of the diaphragm 2 being positioned closest to the object side and an exit pupil position being positioned away from the image-taking surface 5. Therefore, an incidence angle of a light beam incident on a sensor of the image sensor element can be relaxed, and optical performance can be improved.

Moreover, according to the embodiment, a condition expressed by a following expression (1) is satisfied:

$$0.4 \leq r_1/FL \leq 0.55 \qquad (1)$$

where, $r_1$ in the expression (1) is a center radius curvature of a first face 3a of the first lens 3 (the same applies hereinafter). FL in the expression (1) is a focal distance of the entire lens system (the same applies hereinafter).

Here, when the value of $r_1/FL$ is less than the value (0.4) shown in the expression (1), the curvature of the first face 3a of the first lens 3 becomes too large. Manufacturing the first lens 3 becomes difficult. On the other hand, when the value of $r_1/FL$ is greater than the value (0.55) shown in the expression (1), the overall optical system becomes large. Therefore, effectively correcting various aberrations and improving optical performance while reducing size and weight become difficult.

Therefore, according to the embodiment, by the value of $r_1/FL$ being set to satisfy the expression (1), optical performance can be improved while achieving size and weight reduction, and productivity can be improved.

The relationship between $r_1$ and FL is more preferably $0.4 \leq r_1/FL \leq 0.5$.

According to the embodiment, because the second lens 4 is a meniscus lens with a negative power whose convex surface faces the object side in relation to the first lens 3 having a positive power whose convex surface faces the object side such as to satisfy the expression (1), effective aberration correction through combination of the powers of the first lens 3 and the second lens 4 can be achieved.

According to a more preferable embodiment, a condition expressed by a following expression (2) is further satisfied:

$$0.8 \leq f_1/FL \leq 1.1 \qquad (2)$$

where, $f_1$ in the expression (2) is a focal distance of the first lens 3 (the same applies hereinafter).

Here, when the value of $f_1/FL$ is less than the value (0.8) shown in the expression (2), the power of the first lens 3 becomes too large compared to the power of the overall optical system. Effectively correcting various aberrations and achieving the desired optical performance becomes difficult. On the other hand, when the value of $f_1/FL$ is greater than the value (1.1) shown in the expression (2), the power of the first lens 3 becomes too small compared to the power of the overall optical system. Size and weight reduction of the overall optical system becomes difficult to achieve.

Therefore, by the value of $f_1/FL$ being set to satisfy the expression (2), both size and weight reduction and improvement in optical performance can be achieved with further certainty.

The relationship between $f_1$ and FL is more preferably $0.83 < f_1/FL \leq 1.05$.

According to a more preferable embodiment, a condition expressed by a following expression (3) is further satisfied:

$$0.7 \leq d_2/d_1 \leq 1.2 \qquad (3)$$

where, $d_1$ in the expression (3) is a center thickness of the first lens 3 (the same applies hereinafter). $d_2$ in the expression (3) is a distance between the first lens 3 and the second lens 4 on an optical axis 6 (the same applies hereinafter).

Here, when the value of $d_2/d_1$ is less than the value (0.7) shown in the expression (3), the distance between the first lens 3 and the second lens 4 becomes too narrow. Inserting a blocking shield or the like between the first lens 3 and the second lens 4 to effectively block unnecessary light becomes difficult. In addition, edge sections of respective optical surfaces of the first lens 3 and the second lens 4 become too close to each other, thereby increasing generation of unnecessary light. On the other hand, when the value of $d_2/d_1$ is greater than the value (1.2) shown in the expression (3), the center thickness of the first lens 3 becomes too thin. Manufacturing the first lens 3 becomes difficult when the first lens 3 is manufactured by injection molding.

Therefore, by the value of $d_2/d_1$ being set to satisfy the expression (3), a means for effectively blocking unnecessary light can be appropriately employed while improving productivity.

The relationship between $d_1$ and $d_2$ is more preferably $0.7 \leq d_2/d_1 \leq 1.1$.

According to a more preferable embodiment, a condition expressed by a following expression (4) is further satisfied:

$$0.7 \leq d_2/d_3 \leq 1.2 \quad (4)$$

where, $d_3$ in the expression (4) is a center thickness of the second lens 4 (the same applies hereinafter).

Here, when the value of $d_2/d_3$ is less than the value (0.7) shown in the expression (4), the distance between the first lens 3 and the second lens 4 becomes too narrow. Inserting a blocking shield or the like between the first lens 3 and the second lens 4 to effectively block unnecessary light becomes difficult. In addition, the edge sections of respective optical surfaces of the first lens 3 and the second lens 4 become too close to each other, thereby increasing generation of unnecessary light. On the other hand, when the value of $d_2/d_3$ is greater than the value (1.2) shown in the expression (4), the center thickness of the second lens 4 becomes too thin. Manufacturing the second lens 4 becomes difficult when the second lens 4 is manufactured by injection molding.

Therefore, by the value of $d_2/d_3$ being set to satisfy the expression (4), a means for effectively blocking unnecessary light can be appropriately employed while improving productivity.

The relationship between $d_2$ and $d_3$ is more preferably $0.7 \leq d_2/d_3 \leq 1.1$.

According to a more preferable embodiment, a condition expressed by a following expression (5) is further satisfied:

$$0.1 \leq d_1/FL \leq 0.3 \quad (5).$$

Here, when the value of $d_1/FL$ is less than the value (0.1) shown in the expression (5), the center thickness of the first lens 3 becomes too thin. Manufacturing the first lens 3 becomes difficult when the first lens 3 is manufactured by injection molding. On the other hand, when the value of $d_1/FL$ is greater than the value (0.3) shown in the expression (5), the center thickness of the first lens 3 becomes too thick compared to the overall length of the optical system. Size and weight reduction becomes difficult to achieve.

Therefore, by the value of $d_1/FL$ being set to satisfy the expression (5), both size and weight reduction and improvement in productivity can be achieved with further certainty.

The relationship between $d_1$ and FL is more preferably $0.15 \leq d_1/FL \leq 0.285$.

According to a more preferable embodiment, a condition expressed by a following expression (6) is further satisfied:

$$0.1 \leq d_3/FL \leq 0.3 \quad (6).$$

Here, when the value of $d_3/FL$ is less than the value (0.1) shown in the expression (6), the center thickness of the second lens 4 becomes too thin. Manufacturing the second lens 4 becomes difficult when the second lens 4 is manufactured by injection molding. On the other hand, when the value of $d_3/FL$ is greater than the value (0.3) shown in the expression (6), the center thickness of the second lens 4 becomes too thick compared to the overall length of the optical system. Size and weight reduction becomes difficult to achieve.

Therefore, by the value of $d_3/FL$ being set to satisfy the expression (6), excellent balance can be further achieved between size and weight reduction and improvement in productivity.

The relationship between $d_3$ and FL is more preferably $0.15 \leq d_3/FL \leq 0.285$.

According to a more preferable embodiment, a condition expressed by a following expression (7) is further satisfied:

$$0.9 \leq L/FL \leq 1.25 \quad (7)$$

where, L in the expression (7) is an overall length of the lens system or, in other words, a distance from the surface closest to the object side to the image-taking surface 5 on the optical axis 6 (equivalent air length) (the same applies hereinafter).

Here, when the value of L/FL is less than the value (0.9) shown in the expression (7), the overall length of the optical system becomes too short. Productivity during an assembly process of each of the lenses 3 and 4 deteriorates. On the other hand, when the value of L/FL is greater than the value (1.25) shown in the expression (7), the overall length of the optical system becomes too long. Mounting in a small camera of a mobile phone or the like becomes difficult.

Therefore, by the value of L/FL being set to satisfy the expression (7), excellent balance can be further achieved between size and weight reduction and improvement in productivity.

The relationship between L and FL is more preferably $0.95 \leq L/FL \leq 1.2$.

A resin material of any composition can be used to form the first lens 3 and the second lens 4 as long as the material has transparency and can be used to form optical components, such as acrylic, polycarbonate, and amorphous polyolefin resin. To further improve production efficiency and further reduce manufacturing costs, the same resin material is preferably used to form both lenses 3 and 4.

EXAMPLES

Next, EXAMPLES of the present invention will be described by referring to FIG. 2 to FIG. 43.

In the EXAMPLES, Fno denotes F number and r denotes the curvature radius of the optical surface (the center radius curvature in the case of a lens). Further, d denotes a distance to the next optical surface on the optical axis 6, nd denotes the index of refraction when the d line (yellow) is irradiated, and vd denotes the Abbe number of each optical system also when the d line is irradiated.

k, A, B, C, and D denote each coefficient in a following expression (8). Specifically, the shape of the aspherical surface of the lens is expressed by the following expression provided that the direction of the optical axis 6 is taken as the Z axis, the direction orthogonal to the optical axis 6 is taken as the X axis, the traveling direction of light is positive, k is the constant of cone, A, B, C, and D are the aspherical coefficients, and r is the curvature radius.

$$Z(X) = r^{-1}X^2/[1+\{1-(k+1)r^{-2}X^2\}^{1/2}]+AX^4+BX^6+CX^6+DX^{10} \quad (8)$$

In the following EXAMPLES, reference code E used for a numerical value denoting the constant of cone and the aspherical coefficient indicates that the numerical value following E is an exponent having 10 as the base and that the numerical value before E is multiplied by the numerical value denoted by the exponent having 10 as the base. For example, 9.43E+1 denotes $9.43 \times 10^1$.

First Example

FIG. 2 shows a FIRST EXAMPLE of the present invention. The lens 1 in the FIRST EXAMPLE is identical with the lens 1 whose composition is shown in FIG. 1. In the FIRST EXAMPLE, a surface apex (a point intersecting with an optical axis 6) and surrounding area of a first face 3a of the first lens 3 passes through the diaphragm 2 and is positioned closest to the object side.

The imaging lens 1 of the FIRST EXAMPLE was set under the following condition.

Lens Data
L = 1.612 mm, FL = 1.394 mm, $f_1$ = 1.407 mm,
$f_2$ = −59.89 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.7273 | 0.330 | 1.531 | 56.0 |
| 3(Second Face of First Lens) | 20.0000 | 0.340 | | |
| 4(First Face of Second Lens) | 6.2500 | 0.340 | 1.531 | 56.0 |
| 5(Second Face of Second Lens) (Image Surface) | 5.1282 | | | |

| Face Number | k | A | B | C | D |
|---|---|---|---|---|---|
| 2 | 0 | −2.16 | 9.43E+1 | −2.96E+3 | 4.26E+4 |
| 3 | 0 | −2.64E−1 | −6.94E+1 | 1.35E+3 | −1.47E+4 |
| 4 | 0 | 4.62E−1 | −2.10E+2 | 6.09E+3 | −9.94E+4 |
| 5 | 0 | −9.30E−1 | 3.34 | −8.81E+1 | 5.49E+2 |

Under such conditions, $r_1$/FL=0.522 was achieved, thereby satisfying the expression (1). $f_1$/FL=1.009 was achieved, thereby satisfying the expression (2). $d_2/d_1$=1.03 was achieved, thereby satisfying the expression (3). $d_2/d_3$=1.00 was achieved, thereby satisfying the expression (4). $d_1$/FL=0.24 was achieved, thereby satisfying the expression (5). $d_3$/FL=0.24 was achieved, thereby satisfying the expression (6). L/FL=1.156 was achieved, thereby satisfying the expression (7).

FIG. 3 shows the astigmatism and distortion of the imaging lens 1 of the FIRST EXAMPLE.

According to the result, each of the astigmatism and distortion was almost satisfied. It can be seen from the result that a sufficient optical property can be obtained.

Second Example

FIG. 4 shows a SECOND EXAMPLE of the present invention. In the SECOND EXAMPLE, a surface apex and surrounding area of a first face 3a of the first lens 3 passes through the diaphragm 2 and is positioned closest to the object side.

The imaging lens 1 of the SECOND EXAMPLE was set under the following condition.

Lens Data
L = 1.686 mm, FL = 1.470 mm, $f_1$ = 1.406 mm,
$f_2$ = −12.14 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.7273 | 0.360 | 1.531 | 56.0 |
| 3(Second Face of First Lens) | 20.0000 | 0.340 | | |
| 4(First Face of Second Lens) | 50.0000 | 0.400 | 1.531 | 56.0 |
| 5(Second Face of Second Lens) (Image Surface) | 5.7143 | | | |

| Face Number | k | A | B | C | D |
|---|---|---|---|---|---|
| 2 | 0 | −1.84 | 7.60E+1 | −2.16E+3 | 2.69E+4 |
| 3 | 0 | −1.45 | −1.25 | −1.96E+2 | 2.83E+3 |
| 4 | 0 | −1.75 | −7.35E+1 | 2.04E+3 | −3.64E+4 |
| 5 | 0 | −3.71E−1 | −8.88 | 4.69E+1 | −1.40E+2 |

Under such conditions, $r_1$/FL=0.495 was achieved, thereby satisfying the expression (1). $f_1$/FL=0.956 was achieved, thereby satisfying the expression (2). $d_2/d_1$=0.94 was achieved, thereby satisfying the expression (3). $d_2/d_3$=0.85 was achieved, thereby satisfying the expression (4). $d_1$/FL=0.24 was achieved, thereby satisfying the expression (5). $d_3$/FL=0.27 was achieved, thereby satisfying the expression (6). L/FL=1.147 was achieved, thereby satisfying the expression (7).

FIG. 5 shows the astigmatism and distortion of the imaging lens 1 of the SECOND EXAMPLE.

According to the result, each of the astigmatism and distortion was almost satisfied. It can be seen from the result that a sufficient optical property can be obtained.

Third Example

FIG. 6 shows a THIRD EXAMPLE of the present invention. In the THIRD EXAMPLE, a surface apex and surrounding area of a first face 3a of the first lens 3 passes through the diaphragm 2 and is positioned closest to the object side.

The imaging lens 1 of the THIRD EXAMPLE was set under the following condition.

Lens Data
L = 1.656 mm, FL = 1.452 mm, $f_1$ = 1.364 mm,
$f_2$ = −8.178 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.7143 | 0.360 | 1.531 | 56.0 |
| 3(Second Face of First Lens) | 33.3330 | 0.340 | | |
| 4(First Face of Second Lens) | 50.0000 | 0.400 | 1.531 | 56.0 |
| 5(Second Face of Second Lens) (Image Surface) | 4.0000 | | | |

| Face Number | k | A | B | C | D |
|---|---|---|---|---|---|
| 2 | 0 | −2.09 | 8.56E+1 | −2.31E+3 | 2.77E+4 |
| 3 | 0 | −1.27 | −3.26 | −2.08E+2 | 3.07E+3 |
| 4 | 0 | −1.27 | −1.02E+2 | 2.46E+3 | −3.86E+4 |
| 5 | 0 | −5.98E−1 | −9.23 | 5.92E+1 | −1.97E+2 |

Under such conditions, $r_1$/FL=0.492 was achieved, thereby satisfying the expression (1). $f_1$/FL=0.939 was achieved, thereby satisfying the expression (2). $d_2/d_1$=0.94 was achieved, thereby satisfying the expression (3). $d_2/d_3=0.85$ was achieved, thereby satisfying the expression (4). $d_1/FL=0.25$ was achieved, thereby satisfying the expression (5). $d_3/FL=0.28$ was achieved, thereby satisfying the expression (6). $L/FL=1.14$ was achieved, thereby satisfying the expression (7).

FIG. 7 shows the astigmatism and distortion of the imaging lens 1 of the THIRD EXAMPLE.

According to the result, each of the astigmatism and distortion was almost satisfied. It can be seen from the result that a sufficient optical property can be obtained.

Fourth Example

FIG. 8 shows a FOURTH EXAMPLE of the present invention. In the FOURTH EXAMPLE, a surface apex and surrounding area of a first face 3a of the first lens 3 passes through the diaphragm 2 and is positioned closest to the object side.

The imaging lens 1 of the FOURTH EXAMPLE was set under the following condition.

Lens Data
L = 1.619 mm, FL = 1.462 mm, $f_1$ = 1.275 mm,
$f_2$ = −3.32 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.7338 | 0.380 | 1.531 | 56.0 |
| 3(Second Face of First Lens) | −7.625 | 0.370 | | |
| 4(First Face of Second Lens) | 100.0000 | 0.380 | 1.531 | 56.0 |
| 5(Second Face of Second Lens) (Image Surface) | 1.7391 | | | |

| Face Number | k | A | B | C | D |
|---|---|---|---|---|---|
| 2 | 0 | −2.04 | 8.24E+1 | −2.26E+3 | 2.75E+4 |
| 3 | 0 | −1.59 | 4.88 | −2.81E+2 | 3.34E+3 |
| 4 | 0 | −2.66 | −8.77E+1 | 2.27E+3 | −3.77E+4 |
| 5 | 0 | −1.73 | −4.35 | 3.99E+1 | −1.31E+2 |

Under such conditions, $r_1/FL=0.502$ was achieved, thereby satisfying the expression (1). $f_1/FL=0.873$ was achieved, thereby satisfying the expression (2). $d_2/d_1=0.97$ was achieved, thereby satisfying the expression (3). $d_2/d_3=0.97$ was achieved, thereby satisfying the expression (4). $d_1/FL=0.26$ was achieved, thereby satisfying the expression (5). $d_3/FL=0.26$ was achieved, thereby satisfying the expression (6). $L/FL=1.108$ was achieved, thereby satisfying the expression (7).

FIG. 9 shows the astigmatism and distortion of the imaging lens 1 of the FOURTH EXAMPLE.

According to the result, each of the astigmatism and distortion was almost satisfied. It can be seen from the result that a sufficient optical property can be obtained.

Fifth Example

FIG. 10 shows a FIFTH EXAMPLE of the present invention. In the FIFTH EXAMPLE, a surface apex and surrounding area of a first face 3a of the first lens 3 passes through the diaphragm 2 and is positioned closest to the object side.

The imaging lens 1 of the FIFTH EXAMPLE was set under the following condition.

Lens Data
L = 1.611 mm, FL = 1.454 mm, $f_1$ = 1.269 mm,
$f_2$ = −3.508 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.7018 | 0.370 | 1.531 | 56.0 |
| 3(Second Face of First Lens) | −15.3800 | 0.325 | | |
| 4(First Face of Second Lens) | 200.0000 | 0.400 | 1.531 | 56.0 |
| 5(Second Face of Second Lens) (Image Surface) | 1.8519 | | | |

| Face Number | k | A | B | C | D |
|---|---|---|---|---|---|
| 2 | 0 | −2.09 | 8.70E+1 | −2.48E+3 | 3.11E+4 |
| 3 | 0 | −1.76 | 2.00 | −2.83E+2 | 3.59E+3 |
| 4 | 0 | −2.69 | −1.02E+2 | 2.71E+3 | −4.45E+4 |
| 5 | 0 | −1.63 | −3.06 | 3.41E+1 | −1.30E+2 |

Under such conditions, $r_1/FL=0.483$ was achieved, thereby satisfying the expression (1). $f_1/FL=0.873$ was achieved, thereby satisfying the expression (2). $d_2/d_1=0.88$ was achieved, thereby satisfying the expression (3). $d_2/d_3=0.81$ was achieved, thereby satisfying the expression (4). $d_1/FL=0.25$ was achieved, thereby satisfying the expression (5). $d_3/FL=0.28$ was achieved, thereby satisfying the expression (6). $L/FL=1.108$ was achieved, thereby satisfying the expression (7).

FIG. 11 shows the astigmatism and distortion of the imaging lens 1 of the FIFTH EXAMPLE.

According to the result, each of the astigmatism and distortion was almost satisfied. It can be seen from the result that a sufficient optical property can be obtained.

Sixth Example

FIG. 12 shows a SIXTH EXAMPLE of the present invention. In the SIXTH EXAMPLE, a surface apex and surrounding area of a first face 3a of the first lens 3 passes through the diaphragm 2 and is positioned closest to the object side.

The imaging lens 1 of the SIXTH EXAMPLE was set under the following condition.

Lens Data
L = 1.68 mm, FL = 1.538 mm, $f_1$ = 1.339 mm,
$f_2$ = −3.646 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.7143 | 0.380 | 1.531 | 56.0 |
| 3(Second Face of First Lens) | ∞ | 0.355 | | |
| 4(First Face of Second Lens) | 100.0000 | 0.400 | 1.531 | 56.0 |
| 5(Second Face of Second Lens) (Image Surface) | 1.9048 | | | |

| Face Number | k | A | B | C | D |
|---|---|---|---|---|---|
| 2 | 0 | −2.19 | 9.75E+1 | −2.59E+3 | 2.99E+4 |
| 3 | 0 | −1.76 | 1.06E+1 | −3.63E+2 | 3.73E+3 |
| 4 | 0 | −2.82 | −7.33E+1 | 2.11E+3 | −3.72E+4 |
| 5 | 0 | −1.61 | −1.13 | 1.91E+1 | −8.34E+1 |

Under such conditions, $r_1/FL=0.465$ was achieved, thereby satisfying the expression (1). $f_1/FL=0.871$ was achieved, thereby satisfying the expression (2). $d_2/d_1=0.93$ was achieved, thereby satisfying the expression (3). $d_2/d_3=0.89$ was achieved, thereby satisfying the expression (4). $d_1/FL=0.25$ was achieved, thereby satisfying the expression (5). $d_3/FL=0.26$ was achieved, thereby 0satisfying the expression (6). $L/FL=1.093$ was achieved, thereby satisfying the expression (7).

FIG. 13 shows the astigmatism and distortion of the imaging lens 1 of the SIXTH EXAMPLE.

According to the result, each of the astigmatism and distortion was almost satisfied. It can be seen from the result that a sufficient optical property can be obtained.

Seventh Example

FIG. 14 shows a SEVENTH EXAMPLE of the present invention. In the SEVENTH EXAMPLE, a surface apex and surrounding area of a first face 3a of the first lens 3 passes through the diaphragm 2 and is positioned closest to the object side.

The imaging lens 1 of the SEVENTH EXAMPLE was set under the following condition.

| Lens Data $L = 1.643$ mm, $FL = 1.482$ mm, $f_1 = 1.316$ mm, $f_2 = -3.956$ mm, Fno = 2.8 | | | | |
|---|---|---|---|---|
| Face Number | r | d | nd | vd |
| (Object Point) | | | | |
| 1(Diaphragm) | ∞ | -0.030 | | |
| 2(First Face of First Lens) | 0.7018 | 0.380 | 1.531 | 56.0 |
| 3(Second Face of First Lens) | ∞ | 0.355 | | |
| 4(First Face of Second Lens) | 66.6670 | 0.400 | 1.531 | 56.0 |
| 5(Second Face of Second Lens) (Image Surface) | 2.0408 | | | |
| Face Number | k | A | B | C | D |
| 2 | 0 | -2.13 | 9.11E+1 | -2.42E+3 | 2.86E+4 |
| 3 | 0 | -1.62 | 9.41 | -3.38E+2 | 3.58E+3 |
| 4 | 0 | -2.41 | -8.19E+1 | 2.20E+3 | -3.74E+4 |
| 5 | 0 | -1.50 | -1.73 | 1.51E+1 | -4.03E+1 |

Under such conditions, $r_1/FL=0.474$ was achieved, thereby satisfying the expression (1). $f_1/FL=0.888$ was achieved, thereby satisfying the expression (2). $d_2/d_1=0.93$ was achieved, thereby satisfying the expression (3). $d_2/d_3=0.89$ was achieved, thereby satisfying the expression (4). $d_1/FL=0.26$ was achieved, thereby satisfying the expression (5). $d_3/FL=0.27$ was achieved, thereby satisfying the expression (6). $L/FL=1.108$ was achieved, thereby satisfying the expression (7).

FIG. 15 shows the astigmatism and distortion of the imaging lens 1 of the SEVENTH EXAMPLE.

According to the result, each of the astigmatism and distortion was almost satisfied. It can be seen from the result that a sufficient optical property can be obtained.

Eighth Example

FIG. 16 shows a EIGHTH EXAMPLE of the present invention. In the EIGHTH EXAMPLE, a surface apex and surrounding area of a first face 3a of the first lens 3 passes through the diaphragm 2 and is positioned closest to the object side.

The imaging lens 1 of the EIGHTH EXAMPLE was set under the following condition.

| Lens Data $L = 1.653$ mm, $FL = 1.5$ mm, $f_1 = 1.331$ mm, $f_2 = -4.047$ mm, Fno = 2.8 | | | | |
|---|---|---|---|---|
| Face Number | r | d | nd | vd |
| (Object Point) | | | | |
| 1(Diaphragm) | ∞ | -0.030 | | |
| 2(First Face of First Lens) | 0.7018 | 0.380 | 1.531 | 56.0 |
| 3(Second Face of First Lens) | 50.0000 | 0.355 | | |
| 4(First Face of Second Lens) | 40.0000 | 0.390 | 1.531 | 56.0 |
| 5(Second Face of Second Lens) (Image Surface) | 2.0408 | | | |
| Face Number | k | A | B | C | D |
| 2 | 0 | -2.13 | 9.32E+1 | -2.48E+3 | 2.80E+4 |
| 3 | 0 | -1.48 | 7.23 | -3.55E+2 | 3.85E+3 |
| 4 | 0 | -2.00 | -9.19E+1 | 2.32E+3 | -3.76E+4 |
| 5 | 0 | -1.48 | -1.56 | 1.35E+1 | -3.59E+1 |

Under such conditions, $r_1/FL=0.468$ was achieved, thereby satisfying the expression (1). $f_1/FL=0.887$ was achieved, thereby satisfying the expression (2). $d_2/d_1=0.93$ was achieved, thereby satisfying the expression (3). $d_2/d_3=0.91$ was achieved, thereby satisfying the expression (4). $d_1/FL=0.25$ was achieved, thereby satisfying the expression (5). $d_3/FL=0.26$ was achieved, thereby satisfying the expression (6). $L/FL=1.102$ was achieved, thereby satisfying the expression (7).

FIG. 17 shows the astigmatism and distortion of the imaging lens 1 of the EIGHTH EXAMPLE.

According to the result, each of the astigmatism and distortion was almost satisfied. It can be seen from the result that a sufficient optical property can be obtained.

Ninth Example

FIG. 18 shows a NINTH EXAMPLE of the present invention. In the NINTH EXAMPLE, a surface apex and surrounding area of a first face 3a of the first lens 3 passes through the diaphragm 2 and is positioned closest to the object side.

The imaging lens 1 of the NINTH EXAMPLE was set under the following condition.

| Lens Data $L = 1.645$ mm, $FL = 1.483$ mm, $f_1 = 1.331$ mm, $f_2 = -4.583$ mm, Fno = 2.8 | | | | |
|---|---|---|---|---|
| Face Number | r | d | nd | vd |
| (Object Point) | | | | |
| 1(Diaphragm) | ∞ | -0.030 | | |
| 2(First Face of First Lens) | 0.7018 | 0.380 | 1.531 | 56.0 |
| 3(Second Face of First Lens) | 50.0000 | 0.355 | | |
| 4(First Face of Second Lens) | 66.6670 | 0.380 | 1.531 | 56.0 |
| 5(Second Face of Second Lens) (Image Surface) | 2.3529 | | | |
| Face Number | k | A | B | C | D |
| 2 | 0 | -2.19 | 9.43E+1 | -2.46E+3 | 2.79E+4 |
| 3 | 0 | -1.54 | 9.21 | -3.67E+2 | 3.80E+3 |
| 4 | 0 | -2.10 | -9.05E+1 | 2.33E+3 | -3.79E+4 |
| 5 | 0 | -1.47 | -2.14 | 1.53E+1 | -3.44E+1 |

Under such conditions, $r_1/FL=0.473$ was achieved, thereby satisfying the expression (1). $f_1/FL=0.898$ was achieved, thereby satisfying the expression (2). $d_2/d_1=0.93$ was achieved, thereby satisfying the expression (3). $d_2/d_3$=0.93 was achieved, thereby satisfying the expression (4). $d_1$/FL=0.26 was achieved, thereby satisfying the expression (5). $d_3$/FL=0.26 was achieved, thereby satisfying the expression (6). L/FL=1.11 was achieved, thereby satisfying the expression (7).

FIG. 19 shows the astigmatism and distortion of the imaging lens 1 of the NINTH EXAMPLE.

According to the result, each of the astigmatism and distortion was almost satisfied. It can be seen from the result that a sufficient optical property can be obtained.

Tenth Example

FIG. 20 shows a TENTH EXAMPLE of the present invention. In the TENTH EXAMPLE, a surface apex and surrounding area of a first face 3a of the first lens 3 passes through the diaphragm 2 and is positioned closest to the object side.

The imaging lens 1 of the TENTH EXAMPLE was set under the following condition.

Lens Data
L = 1.631 mm, FL = 1.473 mm, $f_1$ = 1.308 mm,
$f_2$ = −3.909 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.6897 | 0.390 | 1.531 | 56.0 |
| 3(Second Face of First Lens) | 50.0000 | 0.355 | | |
| 4(First Face of Second Lens) | 200.0000 | 0.390 | 1.531 | 56.0 |
| 5(Second Face of Second Lens) (Image Surface) | 2.0619 | | | |

| Face Number | k | A | B | C | D |
|---|---|---|---|---|---|
| 2 | 0 | −2.50 | 9.15E+1 | −1.90E+3 | 1.50E+4 |
| 3 | 0 | −1.15 | 2.20 | −3.40E+2 | 6.37E+3 |
| 4 | 0 | 6.04E−1 | −1.64E+2 | 3.16E+3 | −3.94E+4 |
| 5 | 0 | −7.11E−1 | −9.99 | 5.64E+1 | −1.45E+2 |

Under such conditions, $r_1$/FL=0.468 was achieved, thereby satisfying the expression (1). $f_1$/FL=0.888 was achieved, thereby satisfying the expression (2). $d_2/d_1$=0.91 was achieved, thereby satisfying the expression (3). $d_2/d_3$=0.91 was achieved, thereby satisfying the expression (4). $d_1$/FL=0.26 was achieved, thereby satisfying the expression (5). $d_3$/FL=0.26 was achieved, thereby satisfying the expression (6). L/FL=1.108 was achieved, thereby satisfying the expression (7).

FIG. 21 shows the astigmatism and distortion of the imaging lens 1 of the TENTH EXAMPLE.

According to the result, each of the astigmatism and distortion was almost satisfied. It can be seen from the result that a sufficient optical property can be obtained.

Eleventh Example

FIG. 22 shows a ELEVENTH EXAMPLE of the present invention. In the ELEVENTH EXAMPLE, a surface apex a surface apex and surrounding area of a first face 3a of the first lens 3 passes through the diaphragm 2 and is positioned closest to the object side.

The imaging lens 1 of the ELEVENTH EXAMPLE was set under the following condition.

Lens Data
L = 1.586 mm, FL = 1.458 mm, $f_1$ = 1.286 mm,
$f_2$ = −4.636 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.6780 | 0.330 | 1.531 | 56.0 |
| 3(Second Face of First Lens) | 50.0000 | 0.300 | | |
| 4(First Face of Second Lens) | 100.0000 | 0.330 | 1.531 | 56.0 |
| 5(Second Face of Second Lens) (Image Surface) | 2.4096 | | | |

| Face Number | k | A | B | C | D |
|---|---|---|---|---|---|
| 2 | 0 | −2.72 | 9.05E+1 | −2.10E+3 | 1.61E+4 |
| 3 | 0 | −1.81 | −1.57E+1 | −1.70E+2 | 5.33E+3 |
| 4 | 0 | 1.23E−1 | −2.25E+2 | 4.45E+3 | −4.94E+4 |
| 5 | 0 | −6.99E−1 | −2.23E+1 | 2.00E+2 | −8.77E+2 |

Under such conditions, $r_1$/FL=0.465 was achieved, thereby satisfying the expression (1). $f_1$/FL=0.882 was achieved, thereby satisfying the expression (2). $d_2/d_1$=0.91 was achieved, thereby satisfying the expression (3). $d_2/d_3$=0.91 was achieved, thereby satisfying the expression (4). $d_1$/FL=0.23 was achieved, thereby satisfying the expression (5). $d_3$/FL=0.23 was achieved, thereby satisfying the expression (6). L/FL=1.088 was achieved, thereby satisfying the expression (7).

FIG. 23 shows the astigmatism and distortion of the imaging lens 1 of the ELEVENTH EXAMPLE.

According to the result, each of the astigmatism and distortion was almost satisfied. It can be seen from the result that a sufficient optical property can be obtained.

Twelfth Example

FIG. 24 shows a TWELFTH EXAMPLE of the present invention. In the TWELFTH EXAMPLE, a surface apex and surrounding area of a first face 3a of the first lens 3 passes through the diaphragm 2 and is positioned closest to the object side.

The imaging lens 1 of the TWELFTH EXAMPLE was set under the following condition.

Lens Data
L = 1.557 mm, FL = 1.419 mm, $f_1$ = 1.264 mm,
$f_2$ = −4.947 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.6667 | 0.330 | 1.531 | 56.0 |
| 3(Second Face of First Lens) | 50.0000 | 0.280 | | |
| 4(First Face of Second Lens) | 50.0000 | 0.330 | 1.531 | 56.0 |
| 5(Second Face of Second Lens) (Image Surface) | 2.5000 | | | |

| Face Number | k | A | B | C | D |
|---|---|---|---|---|---|
| 2 | 0 | −2.90 | 9.40E+1 | −2.12E+3 | 1.61E+4 |
| 3 | 0 | −1.99 | −1.57E+1 | −1.76E+2 | 5.22E+3 |
| 4 | 0 | 1.17E−1 | −2.39E+2 | 4.76E+3 | −5.22E+4 |
| 5 | 0 | −5.06E−1 | −2.46E+1 | 2.10E+2 | −8.74E+2 |

Under such conditions, $r_1$/FL=0.47 was achieved, thereby satisfying the expression (1). $f_1$/FL=0.891 was achieved, thereby satisfying the expression (2). $d_2/d_1=0.85$ was achieved, thereby satisfying the expression (3). $d_2/d_3=0.85$ was achieved, thereby satisfying the expression (4). $d_1/FL=0.23$ was achieved, thereby satisfying the expression (5). $d_3/FL=0.23$ was achieved, thereby satisfying the expression (6). $L/FL=1.097$ was achieved, thereby satisfying the expression (7).

FIG. 25 shows the astigmatism and distortion of the imaging lens 1 of the TWELFTH EXAMPLE.

According to the result, each of the astigmatism and distortion was almost satisfied. It can be seen from the result that a sufficient optical property can be obtained.

Thirteenth Example

FIG. 26 shows a THIRTEENTH EXAMPLE of the present invention. In the THIRTEENTH EXAMPLE, a surface apex and surrounding area of a first face 3a of the first lens 3 passes through the diaphragm 2 and is positioned closest to the object side.

The imaging lens 1 of the THIRTEENTH EXAMPLE was set under the following condition.

Lens Data
L = 1.593 mm, FL = 1.462 mm, $f_1$ = 1.295 mm,
$f_2$ = −4.814 mm, Fno = 2.8

| Face Number | r | d | nd | νd |
|---|---|---|---|---|
| (Object Point) | | | | |
| 1(Diaphragm) | ∞ | −0.030 | | |
| 2(First Face of First Lens) | 0.6826 | 0.330 | 1.531 | 56.0 |
| 3(Second Face of First Lens) | 50.0000 | 0.305 | | |
| 4(First Face of Second Lens) | 100.0000 | 0.330 | 1.531 | 56.0 |
| 5(Second Face of Second Lens) (Image Surface) | 2.5000 | | | |

| Face Number | k | A | B | C | D |
|---|---|---|---|---|---|
| 2 | 0 | −2.66 | 8.71E+1 | −1.99E+3 | 1.50E+4 |
| 3 | 0 | −1.77 | −1.51E+1 | −1.61E+2 | 4.98E+3 |
| 4 | 0 | 1.20E−1 | −2.17E+2 | 4.21E+3 | −4.61E+4 |
| 5 | 0 | −6.83E−1 | −2.14E+1 | 1.90E+2 | −8.19E+2 |

Under such conditions, $r_1/FL=0.467$ was achieved, thereby satisfying the expression (1). $f_1/FL=0.886$ was achieved, thereby satisfying the expression (2). $d_2/d_1=0.92$ was achieved, thereby satisfying the expression (3). $d_2/d_3=0.92$ was achieved, thereby satisfying the expression (4). $d_1/FL=0.23$ was achieved, thereby satisfying the expression (5). $d_3/FL=0.23$ was achieved, thereby satisfying the expression (6). $L/FL=1.089$ was achieved, thereby satisfying the expression (7).

FIG. 27 shows the astigmatism and distortion of the imaging lens 1 of the THIRTEENTH EXAMPLE.

According to the result, each of the astigmatism and distortion was almost satisfied. It can be seen from the result that a sufficient optical property can be obtained.

Fourteenth Example

FIG. 28 shows a FOURTEENTH EXAMPLE of the present invention. In the FOURTEENTH EXAMPLE, a surface apex and surrounding area of a first face 3a of the first lens 3 passes through the diaphragm 2 and is positioned closest to the object side.

The imaging lens 1 of the FOURTEENTH EXAMPLE was set under the following condition.

Lens Data
L = 1.677 mm, FL = 1.49 mm, $f_1$ = 1.402 mm,
$f_2$ = −8.027 mm, Fno = 2.8

| Face Number | r | d | nd | νd |
|---|---|---|---|---|
| (Object Point) | | | | |
| 1(Diaphragm) | ∞ | −0.030 | | |
| 2(First Face of First Lens) | 0.7142 | 0.380 | 1.531 | 56.0 |
| 3(Second Face of First Lens) | 12.9210 | 0.335 | | |
| 3(Second Face of First Lens) | 11.3590 | 0.370 | 1.531 | 56.0 |
| 5(Second Face of Second Lens) (Image Surface) | 3.0737 | | | |

| Face Number | k | A | B | C | D |
|---|---|---|---|---|---|
| 2 | 0 | −1.59 | 4.80E+1 | −1.11E+3 | 1.17E+4 |
| 3 | 0 | −1.22 | −2.22 | −2.91E+2 | 6.11E+3 |
| 4 | 0 | −8.91E−1 | −1.29E+2 | 3.17E+3 | −4.61E+4 |
| 5 | 0 | −1.24 | −7.11E−1 | −5.89 | 6.64E+1 |

Under such conditions, $r_1/FL=0.479$ was achieved, thereby satisfying the expression (1). $f_1/FL=0.941$ was achieved, thereby satisfying the expression (2). $d_2/d_1=0.88$ was achieved, thereby satisfying the expression (3). $d_2/d_3=0.91$ was achieved, thereby satisfying the expression (4). $d_1/FL=0.26$ was achieved, thereby satisfying the expression (5). $d_3/FL=0.25$ was achieved, thereby satisfying the expression (6). $L/FL=1.126$ was achieved, thereby satisfying the expression (7).

FIG. 29 shows the astigmatism and distortion of the imaging lens 1 of the FOURTEENTH EXAMPLE.

According to the result, each of the astigmatism and distortion was almost satisfied. It can be seen from the result that a sufficient optical property can be obtained.

Fifteenth Example

FIG. 30 shows a FIFTEENTH EXAMPLE of the present invention. In the FIFTEENTH EXAMPLE, a surface apex and surrounding area of a first face 3a of the first lens 3 passes through the diaphragm 2 and is positioned closest to the object side.

The imaging lens 1 of the FIFTEENTH EXAMPLE was set under the following condition.

Lens Data
L = 2.040 mm, FL = 1.74 mm, $f_1$ = 1.586 mm,
$f_2$ = −8.541 mm, Fno = 2.8

| Face Number | r | d | nd | νd |
|---|---|---|---|---|
| (Object Point) | | | | |
| 1(Diaphragm) | ∞ | −0.020 | | |
| 2(First Face of First Lens) | 0.9500 | 0.430 | 1.531 | 56.0 |
| 3(Second Face of First Lens) | −6.5000 | 0.310 | | |
| 4(First Face of Second Lens) | 100.0000 | 0.400 | 1.531 | 56.0 |
| 5(Second Face of Second Lens) (Image Surface) | 4.3500 | | | |

| Face Number | k | A | B | C | D |
|---|---|---|---|---|---|
| 2 | 0 | −1.10 | 1.79E+1 | −3.43E+2 | 2.30E+3 |
| 3 | 0 | −1.35 | −1.68E+1 | 1.95E+2 | −1.61E+3 |
| 4 | 0 | −1.24 | −6.67E+1 | 1.23E+3 | −1.39E+4 |
| 5 | 0 | −7.85E−3 | −1.47E+1 | 1.28E+2 | −6.29E+2 |

Under such conditions, $r_1/FL=0.546$ was achieved, thereby satisfying the expression (1). $f_1/FL=0.912$ was achieved, thereby satisfying the expression (2). $d_2/d_1=0.72$ was achieved, thereby satisfying the expression (3). $d_2/d_3=0.78$ was achieved, thereby satisfying the expression (4). $d_1/FL=0.25$ was achieved, thereby satisfying the expression (5). $d_3/FL=0.23$ was achieved, thereby satisfying the expression (6). $L/FL=1.173$ was achieved, thereby satisfying the expression (7).

FIG. 31 shows the astigmatism and distortion of the imaging lens 1 of the FIFTEENTH EXAMPLE.

According to the result, each of the astigmatism and distortion was almost satisfied. It can be seen from the result that a sufficient optical property can be obtained.

Sixteenth Example

FIG. 32 shows a SIXTEENTH EXAMPLE of the present invention. In the SIXTEENTH EXAMPLE, a surface apex and surrounding area of a first face 3a of the first lens 3 passes through the diaphragm 2 and is positioned closest to the object side.

The imaging lens 1 of the SIXTEENTH EXAMPLE was set under the following condition.

Lens Data
L = 1.608 mm, FL = 1.389 mm, $f_1$ = 1.407 mm,
$f_2$ = −72.8 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.7273 | 0.330 | 1.531 | 56.0 |
| 3(Second Face of First Lens) | 20.0000 | 0.345 | | |
| 4(First Face of Second Lens) | 5.7140 | 0.340 | 1.531 | 56.0 |
| 5(Second Face of Second Lens) (Image Surface) | 4.8780 | | | |

| Face Number | k | A | B | C | D |
|---|---|---|---|---|---|
| 2 | 0 | −2.16 | 9.43E+1 | −2.96E+3 | 4.26E+4 |
| 3 | 0 | −2.64E−1 | −6.94E+1 | 1.35E+3 | −1.47E+4 |
| 4 | 0 | 4.62E−1 | −2.10E+2 | 6.09E+3 | −9.94E+4 |
| 5 | 0 | −9.68E−1 | 2.63 | −8.23E+1 | 4.94E+2 |

Under such conditions, $r_1/FL=0.524$ was achieved, thereby satisfying the expression (1). $f_1/FL=1.013$ was achieved, thereby satisfying the expression (2). $d_2/d_1=1.05$ was achieved, thereby satisfying the expression (3). $d_2/d_3=1.01$ was achieved, thereby satisfying the expression (4). $d_1/FL=0.24$ was achieved, thereby satisfying the expression (5). $d_3/FL=0.24$ was achieved, thereby satisfying the expression (6). $L/FL=1.158$ was achieved, thereby satisfying the expression (7).

FIG. 33 shows the astigmatism and distortion of the imaging lens 1 of the SIXTEENTH EXAMPLE.

According to the result, each of the astigmatism and distortion was almost satisfied. It can be seen from the result that a sufficient optical property can be obtained.

Seventeenth Example

FIG. 34 shows a SEVENTEENTH EXAMPLE of the present invention. In the SEVENTEENTH EXAMPLE, a surface apex and surrounding area of a first, face 3a of the first lens 3 passes through the diaphragm 2 and is positioned closest to the object side.

The imaging lens 1 of the SEVENTEENTH EXAMPLE was set under the following condition.

Lens Data
L = 1.574 mm, FL = 1.358 mm, $f_1$ = 1.377 mm,
$f_2$ = −62.62 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.7018 | 0.330 | 1.531 | 56.0 |
| 3(Second Face of First Lens) | 13.3330 | 0.355 | | |
| 4(First Face of Second Lens) | 5.2632 | 0.340 | 1.531 | 56.0 |
| 5(Second Face of Second Lens) (Image Surface) | 4.4444 | | | |

| Face Number | k | A | B | C | D |
|---|---|---|---|---|---|
| 2 | 0 | −2.16 | 9.43E+1 | −2.96E+3 | 4.26E+4 |
| 3 | 0 | −2.64E−1 | −6.94E+1 | 1.35E+3 | −1.47E+4 |
| 4 | 0 | 4.62E−1 | −2.10E+2 | 6.09E+3 | −9.94E+4 |
| 5 | 0 | −9.52E−1 | 2.65 | −8.52E+1 | 5.19E+2 |

Under such conditions, $r_1/FL=0.517$ was achieved, thereby satisfying the expression (1). $f_1/FL=1.014$ was achieved, thereby satisfying the expression (2). $d_2/d_1=1.08$ was achieved, thereby satisfying the expression (3). $d_2/d_3=1.04$ was achieved, thereby satisfying the expression (4). $d_1/FL=0.24$ was achieved, thereby satisfying the expression (5). $d_3/FL=0.25$ was achieved, thereby satisfying the expression (6). $L/FL=1.16$ was achieved, thereby satisfying the expression (7).

FIG. 35 shows the astigmatism and distortion of the imaging lens 1 of the SEVENTEENTH EXAMPLE.

According to the result, each of the astigmatism and distortion was almost satisfied. It can be seen from the result that a sufficient optical property can be obtained.

Eighteenth Example

FIG. 36 shows a EIGHTEENTH EXAMPLE of the present invention. In the EIGHTEENTH EXAMPLE, a surface apex and surrounding area of a first face 3a of the first lens 3 passes through the diaphragm 2 and is positioned closest to the object side.

The imaging lens 1 of the EIGHTEENTH EXAMPLE was set under the following condition.

Lens Data
L = 1.63 mm, FL = 1.44 mm, $f_1$ = 1.4 mm,
$f_2$ = −18 mm, Fno = 2.8

| Face Number | r | d | nd | vd |
|---|---|---|---|---|
| (Object Point) | | | | |
| 1(Diaphragm) | ∞ | −0.0300 | | |
| 2(First Face of First Lens) | 0.6719 | 0.3374 | 1.531 | 56.0 |
| 3(Second Face of First Lens) | 5.5540 | 0.3200 | | |
| 4(First Face of Second Lens) | 22.8400 | 0.3580 | 1.531 | 56.0 |
| 5(Second Face of Second Lens) (Image Surface) | 6.7200 | | | |

| Face Number | k | A | B | C | D |
|---|---|---|---|---|---|
| 2 | 0 | −2.31 | 1.02E+2 | −2.92E+3 | 3.90E+4 |
| 3 | 0 | −1.49 | 5.38 | −4.42E+2 | 4.06E+3 |
| 4 | 0 | −9.67E−1 | −1.32E+2 | 3.51E+3 | −5.77E+4 |
| 5 | 0 | −9.98E−1 | −4.40E−1 | −3.46E+1 | 2.80E+2 |

Under such conditions, $r_1/FL=0.467$ was achieved, thereby satisfying the expression (1). $f_1/FL=0.972$ was achieved, thereby satisfying the expression (2). $d_2/d_1=0.95$ was achieved, thereby satisfying the expression (3). $d_2/d_3=0.89$ was achieved, thereby satisfying the expression (4). $d_1/FL=0.23$ was achieved, thereby satisfying the expression (5). $d_3/FL=0.25$ was achieved, thereby satisfying the expression (6). $L/FL=1.132$ was achieved, thereby satisfying the expression (7).

FIG. 37 shows the astigmatism and distortion of the imaging lens 1 of the EIGHTEENTH EXAMPLE.

According to the result, each of the astigmatism and distortion was almost satisfied. It can be seen from the result that a sufficient optical property can be obtained.

Nineteenth Example

FIG. 38 shows a NINETEENTH EXAMPLE of the present invention. In the NINETEENTH EXAMPLE, a surface apex and surrounding area of a first face 3a of the first lens 3 passes through the diaphragm 2 and is positioned closest to the object side.

The imaging lens 1 of the NINETEENTH EXAMPLE was set under the following condition.

Lens Data
L = 1.588 mm, FL = 1.38 mm, $f_1$ = 1.384 mm,
$f_2$ = −51.99 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.6769 | 0.330 | 1.531 | 56.0 |
| 3(Second Face of First Lens) | 6.7690 | 0.320 | | |
| 4(First Face of Second Lens) | 8.4285 | 0.350 | 1.531 | 56.0 |
| 5(Second Face of Second Lens) (Image Surface) | 6.3700 | | | |

| Face Number | k | A | B | C | D |
|---|---|---|---|---|---|
| 2 | 0 | −2.93 | 1.37E+2 | −4.27E+3 | 6.83E+4 |
| 3 | 0 | −1.84 | 3.15E+1 | −1.15E+3 | 1.24E+4 |
| 4 | 0 | 4.62E−1 | −2.10E+2 | 6.09E+3 | −9.94E+4 |
| 5 | 0 | −9.02E−1 | 2.10 | −6.86E+1 | 4.34E+2 |

Under such conditions, $r_1/FL=0.491$ was achieved, thereby satisfying the expression (1). $f_1/FL=1.003$ was achieved, thereby satisfying the expression (2). $d_2/d_1=0.97$ was achieved, thereby satisfying the expression (3). $d_2/d_3=0.91$ was achieved, thereby satisfying the expression (4). $d_1/FL=0.24$ was achieved, thereby satisfying the expression (5). $d_3/FL=0.25$ was achieved, thereby satisfying the expression (6). $L/FL=1.150$ was achieved, thereby satisfying the expression (7).

FIG. 39 shows the astigmatism and distortion of the imaging lens 1 of the NINETEENTH EXAMPLE.

According to the result, each of the astigmatism and distortion was almost satisfied. It can be seen from the result that a sufficient optical property can be obtained.

Twentieth Example

FIG. 40 shows a TWENTIETH EXAMPLE of the present invention. In the TWENTIETH EXAMPLE, a surface apex and surrounding area of a first face 3a of the first lens 3 passes through the diaphragm 2 and is positioned closest to the object side.

The imaging lens 1 of the TWENTIETH EXAMPLE was set under the following condition.

Lens Data
L = 1.574 mm, FL = 1.369 mm, $f_1$ = 1.363 mm,
$f_2$ = −38.58 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.6667 | 0.330 | 1.531 | 56.0 |
| 3(Second Face of First Lens) | 6.6667 | 0.330 | | |
| 4(First Face of Second Lens) | 11.7650 | 0.350 | 1.531 | 56.0 |
| 5(Second Face of Second Lens) (Image Surface) | 7.4070 | | | |

| Face Number | k | A | B | C | D |
|---|---|---|---|---|---|
| 2 | 0 | −2.89 | 1.37E+2 | −4.27E+3 | 6.83E+4 |
| 3 | 0 | −1.71 | 2.77E+1 | −1.05E+3 | 1.17E+4 |
| 4 | 0 | 5.06E−1 | −2.18E+2 | 6.20E+3 | −1.00E+5 |
| 5 | 0 | −1.00 | 2.43 | −6.83E+1 | 4.24E+2 |

Under such conditions, $r_1/FL=0.487$ was achieved, thereby satisfying the expression (1). $f_1/FL=0.996$ was achieved, thereby satisfying the expression (2). $d_2/d_1=1.00$ was achieved, thereby satisfying the expression (3). $d_2/d_3=0.94$ was achieved, thereby satisfying the expression (4). $d_1/FL=0.24$ was achieved, thereby satisfying the expression (5). $d_3/FL=0.26$ was achieved, thereby satisfying the expression (6). $L/FL=1.15$ was achieved, thereby satisfying the expression (7).

FIG. 41 shows the astigmatism and distortion of the imaging lens 1 of the TWENTIETH EXAMPLE.

According to the result, each of the astigmatism and distortion was almost satisfied. It can be seen from the result that a sufficient optical property can be obtained.

Twenty First Example

FIG. 42 shows a TWENTY FIRST EXAMPLE of the present invention. In the TWENTY FIRST EXAMPLE, a surface apex and surrounding area of a first face 3a of the first lens 3 passes through the diaphragm 2 and is positioned closest to the object side.

The imaging lens 1 of the TWENTY FIRST EXAMPLE was set under the following condition.

Lens Data
L = 1.584 mm, FL = 1.372 mm, $f_1$ = 1.379 mm,
$f_2$ = −63.14 mm, Fno = 2.8

| Face Number | r | d | nd | vd |
|---|---|---|---|---|
| (Object Point) | | | | |
| 1(Diaphragm) | ∞ | −0.030 | | |
| 2(First Face of First Lens) | 0.6750 | 0.340 | 1.531 | 56.0 |
| 3(Second Face of First Lens) | 6.8000 | 0.355 | | |
| 4(First Face of Second Lens) | 8.7500 | 0.345 | 1.531 | 56.0 |
| 5(Second Face of Second Lens) (Image Surface) | 6.8500 | | | |

| Face Number | k | A | B | C | D |
|---|---|---|---|---|---|
| 2 | 0 | −1.85 | 8.35E+1 | −2.99E+3 | 5.04E+4 |
| 3 | 0 | −1.84 | 3.15E+1 | −1.15E+3 | 1.24E+4 |
| 4 | 0 | −1.44 | −1.21E+2 | 3.95E+3 | −7.68E+4 |
| 5 | 0 | −3.30E−1 | −8.00 | −1.22E+1 | 2.42E+2 |

Under such conditions, $r_1/FL=0.492$ was achieved, thereby satisfying the expression (1). $f_1/FL=1.005$ was achieved, thereby satisfying the expression (2). $d_2/d_1=1.04$ was achieved, thereby satisfying the expression (3). $d_2/d_3=1.03$ was achieved, thereby satisfying the expression (4). $d_1/FL=0.25$ was achieved, thereby satisfying the expression (5). $d_3/FL=0.25$ was achieved, thereby satisfying the expression (6). $L/FL=1.155$ was achieved, thereby satisfying the expression (7).

FIG. 43 shows the astigmatism and distortion of the imaging lens 1 of the TWENTY FIRST EXAMPLE.

According to the result, each of the astigmatism and distortion was almost satisfied. It can be seen from the result that a sufficient optical property can be obtained.

The present invention is not limited to the above-described embodiments and EXAMPLES, and various modifications are possible as required.

What is claimed is:

1. An imaging lens used for forming an image of an object on an image-taking surface of an image sensor element consisting of, in order from an object side to an image surface side: a diaphragm, a first lens having a positive power whose convex surface faces the object side, and a second lens that is a meniscus lens having a negative power whose convex surface faces the object side, wherein a condition expressed by the following expression (1) is to be satisfied:

$$0.4 \leq r_1/FL \leq 0.55 \qquad (1)$$

where, $r_1$: center radius curvature of the object side face of the first lens

FL: focal distance of the entire lens system.

2. An imaging lens according to claim 1, wherein, further, a condition expressed by a following expression (2) is to be satisfied:

$$0.8 \leq f_1/FL \leq 1.1 \qquad (2)$$

where, $f_1$: focal distance of the first lens.

3. An imaging lens according to claim 1, wherein, further, a condition expressed by a following expression (3) is to be satisfied:

$$0.7 \leq d_2/d_1 \leq 1.2 \qquad (3)$$

where, $d_1$: center thickness of the first lends $d_2$: distance between the first lens and the second lens on the optical axis.

4. An imaging lens according to claim 1, wherein, further, a condition expressed by a following expression (4) is further satisfied:

$$0.7 \leq d_2/d_3 \leq 1.2 \qquad (4)$$

where, $d_2$: distance between the first lens and the second lens on the optical axis $d_3$: center thickness of the second lens.

5. An imaging lens according to claim 1, wherein, further, a condition expressed by a following expression (5) is further satisfied:

$$0.1 \leq d_1/FL \leq 0.3 \qquad (5)$$

where, $d_1$: center thickness of the first lens.

6. An imaging lens according to claim 1, wherein, further, a condition expressed by a following expression (6) is further satisfied:

$$0.1 \leq d_3/FL \leq 0.3 \qquad (6)$$

where, $d_3$: center thickness of the second lens.

7. An imaging lens according to claim 1, wherein, further, a condition expressed by a following expression (7) is further satisfied:

$$0.9 \leq L/FL \leq 1.25 \qquad (7)$$

where,

L: overall length of the lens system (distance from the surface closest to the object side to the image-taking surface on the optical axis: equivalent air length).

* * * * *